(12) United States Patent
Farber et al.

(10) Patent No.: US 11,639,617 B1
(45) Date of Patent: May 2, 2023

(54) ACCESS CONTROL SYSTEM AND METHOD

(71) Applicant: The Chamberlain Group LLC, Oak Brook, IL (US)

(72) Inventors: Jordan Ari Farber, Oak Brook, IL (US); Cory Jon Sorice, LaGrange, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 933 days.

(21) Appl. No.: 16/374,128

(22) Filed: Apr. 3, 2019

(51) Int. Cl.
*E05B 49/00* (2006.01)
*E05B 47/06* (2006.01)
(Continued)

(52) U.S. Cl.
CPC ........ *E05B 49/006* (2013.01); *E05B 19/0011* (2013.01); *E05B 35/001* (2013.01); *E05B 47/0001* (2013.01); *E05B 47/02* (2013.01); *E05B 47/0619* (2013.01); *G05B 15/02* (2013.01); *G07C 9/00182* (2013.01);
(Continued)

(58) Field of Classification Search
CPC .... E05B 19/0011; E05B 19/24; E05B 35/001; E05B 47/0001; E05B 47/0619; E05B 47/063; E05B 47/02; E05B 2047/0048; E05B 2047/0063; E05B 2047/0067; E05B 2047/0072; E05B 2047/0084; E05B 2047/0085; E05B 2047/0088; E05B 2047/0095; G01B 7/28; G05B 15/02; G07C 9/00182
See application file for complete search history.

(56) References Cited

U.S. PATENT DOCUMENTS 579,951 A 4/1897 Bystrom
1,489,675 A 4/1924 Schlage
(Continued)

FOREIGN PATENT DOCUMENTS

JP 2002256746 9/2002
JP 04332125 8/2006
WO 2000060197 10/2000

OTHER PUBLICATIONS

Wayback macine archive, dated Mar. 6, 2019, Kwikset SmartKey, https://www.kwikset.com/smart-security, 9 pages.
(Continued)

*Primary Examiner* — Christopher J Boswell
(74) *Attorney, Agent, or Firm* — Fitch, Even, Tabin & Flannery LLP

(57) ABSTRACT

A lock for securing a door is provided, the lock includes a housing configured to be mounted on a door, a locking member movable between locked and unlocked positions, a core with a keyway and configured to turn relative to the housing to cause the locking member to move between the locked and unlocked positions, at least one optical source configured to emit an electromagnetic radiation signal at an object in the keyway, at least one optical detector configured to detect at least a portion of the electromagnetic radiation signal, a memory configured to store at least one authorized key characteristic, a motor configured to control movement of the locking member between locked and unlocked positions, and a processor that determines at least one sensed characteristic of the object in the keyway based at least in part on the electromagnetic radiation signal.

26 Claims, 4 Drawing Sheets

(51) Int. Cl.
- *G07C 9/00* (2020.01)
- *G05B 15/02* (2006.01)
- *E05B 19/00* (2006.01)
- *E05B 35/00* (2006.01)
- *E05B 47/00* (2006.01)
- *E05B 47/02* (2006.01)
- *E05B 19/24* (2006.01)

(52) U.S. Cl.
CPC .............. *E05B 19/24* (2013.01); *E05B 47/063* (2013.01); *E05B 2047/0067* (2013.01); *E05B 2047/0072* (2013.01); *E05B 2047/0084* (2013.01); *E05Y 2900/132* (2013.01)

(56) References Cited

U.S. PATENT DOCUMENTS

| | | | |
|---|---|---|---|
| 1,552,389 A | 9/1925 | Stephenson | |
| 3,733,861 A | 5/1973 | Lester | |
| 3,733,862 A * | 5/1973 | Killmeyer | E05B 49/006 340/5.67 |
| 3,861,727 A | 1/1975 | Froerup | |
| 3,919,869 A | 11/1975 | Fromm | |
| 4,126,341 A | 11/1978 | Bradstock | |
| 4,144,523 A * | 3/1979 | Kaplit | E05B 49/006 365/96 |
| 4,227,723 A | 10/1980 | Rosell | |
| 4,298,792 A * | 11/1981 | Granholm | E05B 49/006 235/458 |
| 4,396,914 A | 8/1983 | Aston | |
| 4,433,355 A | 2/1984 | Chew | |
| 4,485,381 A | 11/1984 | Lewiner | |
| 4,593,185 A | 6/1986 | Patzelt | |
| 4,594,637 A | 6/1986 | Falk | |
| 4,595,220 A | 6/1986 | Hanchett, Jr. | |
| 4,631,944 A | 12/1986 | Gater | |
| 4,662,197 A | 5/1987 | Tietz | |
| 4,672,829 A | 6/1987 | Gater | |
| 4,717,816 A | 1/1988 | Raymond | |
| 4,743,898 A | 5/1988 | Imedio | |
| 4,770,012 A | 9/1988 | Johansson | |
| 4,807,454 A | 2/1989 | Sengupta | |
| 4,833,465 A | 5/1989 | Abend | |
| 4,866,963 A | 9/1989 | Leininger | |
| 4,868,559 A * | 9/1989 | Pinnow | E05B 49/006 340/5.67 |
| 4,870,400 A | 9/1989 | Downs | |
| 4,871,204 A | 10/1989 | Cook | |
| 4,947,662 A | 8/1990 | Imedio | |
| 4,949,563 A | 8/1990 | Gerard | |
| 4,998,952 A | 3/1991 | Hyatt, Jr. | |
| 5,021,776 A | 6/1991 | Anderson | |
| 5,042,857 A | 8/1991 | Burrows | |
| 5,043,593 A * | 8/1991 | Tsutsumi | E05B 49/006 180/287 |
| 5,089,692 A | 2/1992 | Tonnesson | |
| 5,132,661 A * | 7/1992 | Pinnow | E05B 49/006 340/5.67 |
| 5,140,317 A | 8/1992 | Hyatt, Jr. | |
| 5,260,551 A | 11/1993 | Wiik | |
| 5,319,362 A | 6/1994 | Hyatt, Jr. | |
| 5,351,042 A | 9/1994 | Aston | |
| 5,364,139 A | 11/1994 | Bergen | |
| 5,473,236 A | 12/1995 | Frolov | |
| 5,490,698 A | 2/1996 | Dezso | |
| 5,540,069 A | 7/1996 | Muller | |
| 5,541,581 A | 7/1996 | Trent | |
| 5,543,665 A | 8/1996 | Demarco | |
| 5,591,950 A | 1/1997 | Imedio-Ocana | |
| 5,605,066 A | 2/1997 | Hurskainen | |
| RE35,518 E | 5/1997 | Sussina | |
| 5,670,940 A | 9/1997 | Holcomb | |
| 5,715,715 A | 2/1998 | Nunez | |
| 5,718,135 A | 2/1998 | Bertenshaw | |
| 5,722,273 A | 3/1998 | Lin | |
| 5,745,044 A | 4/1998 | Hyatt, Jr. | |
| 5,745,045 A * | 4/1998 | Kulha | E05B 49/006 235/382 |
| 5,757,269 A | 5/1998 | Roth | |
| 5,758,527 A | 6/1998 | Crepinsek | |
| 5,775,148 A | 7/1998 | Layton | |
| 5,791,178 A | 8/1998 | Chamberlain | |
| 5,799,518 A | 9/1998 | Du | |
| 5,809,812 A | 9/1998 | Gallego | |
| 5,841,361 A | 11/1998 | Hoffman | |
| 5,857,365 A | 1/1999 | Armstrong | |
| 5,862,692 A | 1/1999 | Legault | |
| 5,873,276 A | 2/1999 | Dawson | |
| 5,884,515 A | 3/1999 | Milman | |
| 5,920,268 A | 7/1999 | Bucci | |
| 5,933,085 A | 8/1999 | Holcomb | |
| 5,933,086 A | 8/1999 | Tischendorf | |
| 5,960,656 A | 10/1999 | Yao | |
| RE36,426 E | 12/1999 | Wiik et al. | |
| 6,005,487 A | 12/1999 | Hyatt, Jr. | |
| 6,038,896 A | 3/2000 | Chamberlain | |
| 6,082,153 A | 7/2000 | Schoell | |
| 6,111,977 A | 8/2000 | Scott | |
| 6,145,353 A | 11/2000 | Doucet | |
| 6,147,622 A | 11/2000 | Fonea | |
| 6,216,502 B1 | 4/2001 | Cannella | |
| 6,227,020 B1 | 5/2001 | Lerchner | |
| 6,260,300 B1 | 7/2001 | Klebes | |
| 6,282,929 B1 | 9/2001 | Eller | |
| 6,297,725 B1 | 10/2001 | Tischendorf | |
| 6,298,699 B1 | 10/2001 | Gartner | |
| 6,318,134 B1 | 11/2001 | Mossberg | |
| 6,318,137 B1 * | 11/2001 | Chaum | E05B 49/002 340/5.67 |
| 6,331,812 B1 | 12/2001 | Dawalibi | |
| 6,334,348 B1 | 1/2002 | Ming-Chih | |
| 6,384,711 B1 | 5/2002 | Cregger | |
| 6,398,274 B1 | 6/2002 | Huang | |
| 6,406,072 B1 | 6/2002 | Chen | |
| 6,422,614 B1 | 7/2002 | Kuntz | |
| 6,427,505 B2 | 8/2002 | Imedio Ocana | |
| 6,539,755 B1 | 4/2003 | Bruwer | |
| 6,581,426 B2 | 6/2003 | Bates | |
| 6,581,991 B2 | 6/2003 | Galindo | |
| 6,584,818 B2 | 7/2003 | Bates | |
| 6,591,643 B1 | 7/2003 | Cannella | |
| 6,600,406 B1 | 7/2003 | Ha | |
| 6,609,402 B2 | 8/2003 | Blankenship | |
| 6,609,738 B1 | 8/2003 | Roth | |
| 6,612,141 B2 | 9/2003 | Bates | |
| 6,615,629 B2 | 9/2003 | Bates | |
| 6,622,535 B2 | 9/2003 | Chiang | |
| 6,622,912 B2 | 9/2003 | Tejedor Ruiz | |
| 6,640,594 B1 | 11/2003 | Yao | |
| 6,714,118 B1 | 3/2004 | Frolov | |
| 6,718,806 B2 | 4/2004 | Davis | |
| 6,745,603 B1 | 6/2004 | Shaw | |
| 6,822,552 B2 | 11/2004 | Liden | |
| 6,848,729 B2 | 2/2005 | Caspi | |
| 6,851,291 B2 | 2/2005 | Nunez | |
| 6,854,305 B2 | 2/2005 | Hurskainen | |
| 6,867,685 B1 | 3/2005 | Stillwagon | |
| 6,932,486 B1 | 8/2005 | Eller | |
| 6,935,663 B2 | 8/2005 | Schildwachter | |
| 6,938,445 B2 | 9/2005 | Huang | |
| 6,963,266 B2 | 11/2005 | Hilkka | |
| 6,971,686 B2 | 12/2005 | Becken | |
| 7,007,526 B2 | 3/2006 | Frolov | |
| 7,009,489 B2 | 3/2006 | Fisher | |
| 7,032,418 B2 | 4/2006 | Martin | |
| 7,040,125 B2 | 5/2006 | Ciezki | |
| 7,052,054 B2 | 5/2006 | Luker | |
| 7,066,507 B2 | 6/2006 | Don | |
| 7,069,755 B2 | 7/2006 | Lies | |
| 7,077,437 B2 | 7/2006 | Huang | |
| 7,086,258 B2 | 8/2006 | Fisher | |
| 7,091,429 B2 | 8/2006 | Case | |
| 7,099,474 B1 | 8/2006 | Liden | |
| 7,111,165 B2 | 9/2006 | Liden | |

(56) References Cited

U.S. PATENT DOCUMENTS

| | | |
|---|---|---|
| 7,188,870 B2 | 3/2007 | Huang |
| 7,287,787 B1 | 10/2007 | Tannone |
| 7,308,584 B2 | 12/2007 | Himmel |
| 7,334,442 B2 | 2/2008 | Case |
| 7,347,461 B2 | 3/2008 | Sprague |
| 7,347,463 B2 | 3/2008 | Blight |
| 7,363,784 B2 | 4/2008 | Shvarts |
| 7,374,084 B2 | 5/2008 | Mitchell |
| 7,377,144 B1 | 5/2008 | Huang |
| 7,378,939 B2 | 5/2008 | Sengupta |
| 7,389,661 B2 | 6/2008 | Viviano |
| 7,397,341 B2 | 7/2008 | Bhat |
| 7,431,354 B2 | 10/2008 | Raatikainen |
| 7,452,012 B2 | 11/2008 | Huang |
| 7,463,132 B2 | 12/2008 | Deng |
| 7,515,033 B2 | 4/2009 | Roosli |
| 7,520,152 B2 | 4/2009 | Sabo |
| 7,526,934 B2 | 5/2009 | Conforti |
| 7,528,700 B2 | 5/2009 | Picard |
| 7,543,469 B1 | 6/2009 | Tseng |
| 7,543,755 B2 | 6/2009 | Doi |
| 7,565,825 B2 | 7/2009 | Wheatland |
| 7,600,129 B2 | 10/2009 | Libin |
| 7,647,797 B1 | 1/2010 | Viso Cabrera |
| 7,706,778 B2 | 4/2010 | Lowe |
| 7,735,732 B2 | 6/2010 | Linton |
| 7,770,423 B2 | 8/2010 | Wu |
| 7,796,052 B2 | 9/2010 | Katz |
| 7,827,837 B2 | 11/2010 | Huang |
| 7,843,312 B2 | 11/2010 | Eskildsen |
| 7,845,202 B2 | 12/2010 | Padilla |
| 7,856,856 B2 | 12/2010 | Shvartz |
| 7,878,560 B1 | 2/2011 | Scheffler |
| 7,903,846 B2 | 3/2011 | Fisher |
| 7,941,934 B2 | 5/2011 | Gerner |
| 7,958,647 B2 | 6/2011 | Gerner |
| 7,966,854 B2 | 6/2011 | Imedio Ocana |
| 7,967,197 B2 | 6/2011 | Popowski |
| 7,984,631 B2 | 7/2011 | Case |
| 7,984,875 B2 | 7/2011 | Koehn |
| 7,999,656 B2 | 8/2011 | Fisher |
| 8,001,818 B2 | 8/2011 | Imedio Ocana |
| 8,028,553 B2 | 10/2011 | Lange |
| 8,033,147 B2 | 10/2011 | Lie-Nielsen |
| 8,035,478 B2 | 10/2011 | Lee |
| 8,045,960 B2 | 10/2011 | Orakkan |
| 8,047,030 B2 | 11/2011 | Gray |
| 8,085,126 B2 | 12/2011 | Determan |
| 8,093,986 B2 | 1/2012 | Harvey |
| 8,138,886 B1 | 3/2012 | Chang |
| 8,141,400 B2 | 3/2012 | Sorensen |
| 8,150,374 B2 | 4/2012 | Lowe |
| 8,157,302 B1 | 4/2012 | Webb |
| 8,161,782 B2 | 4/2012 | Haakansson |
| 8,176,761 B2 | 5/2012 | Sorensen |
| 8,186,585 B2 | 5/2012 | Popowski |
| 8,222,990 B2 | 7/2012 | Gerner |
| 8,222,993 B2 | 7/2012 | Bliding |
| 8,231,051 B2 | 7/2012 | Popowski |
| 8,261,319 B2 | 9/2012 | Libin |
| 8,275,345 B2 | 9/2012 | Bumiller |
| 8,276,948 B2 | 10/2012 | Uyeda |
| 8,291,733 B2 | 10/2012 | Chiou |
| 8,314,681 B2 * | 11/2012 | Bell ........................ B60R 25/00 340/5.6 |
| 8,331,544 B2 | 12/2012 | Kraus |
| 8,353,189 B2 | 1/2013 | Bogdanov |
| 8,354,914 B2 | 1/2013 | Buckingham |
| 8,358,783 B2 | 1/2013 | Davis |
| 8,366,157 B2 | 2/2013 | Helisten |
| 8,381,558 B2 | 2/2013 | Alef |
| 8,393,280 B2 | 3/2013 | Bartel |
| 8,419,084 B2 | 4/2013 | Ding |
| 8,454,063 B2 | 6/2013 | David |
| 8,479,543 B2 | 7/2013 | Yang |
| 8,490,445 B2 | 7/2013 | Chiou |
| 8,523,249 B2 | 9/2013 | Hodgin |
| 8,534,099 B2 | 9/2013 | Wheeler |
| 8,540,291 B2 | 9/2013 | Bliding |
| 8,562,040 B2 | 10/2013 | Scheffler |
| 8,587,405 B2 | 11/2013 | Denison |
| 8,593,249 B2 | 11/2013 | Bliding |
| 8,610,535 B2 | 12/2013 | Hui |
| 8,620,269 B2 | 12/2013 | Johar |
| 8,621,900 B2 | 1/2014 | Wu |
| 8,638,227 B2 | 1/2014 | Yuan |
| 8,677,792 B2 | 3/2014 | Wheeler |
| 8,683,833 B2 | 4/2014 | Marschalek |
| 8,687,341 B2 | 4/2014 | Schoepke |
| 8,720,959 B2 | 5/2014 | Wittke |
| 8,731,466 B2 | 5/2014 | Metivier |
| 8,746,760 B2 | 6/2014 | Chen |
| 8,774,714 B2 | 7/2014 | Metivier |
| 8,787,902 B2 | 7/2014 | Kim |
| 8,839,557 B2 | 9/2014 | Sheldon |
| 8,866,066 B2 | 10/2014 | Fuse |
| 8,881,567 B2 | 11/2014 | Chong |
| 8,881,637 B2 | 11/2014 | Leites |
| 8,887,542 B2 | 11/2014 | Bogdanov |
| 8,904,837 B1 | 12/2014 | Lin |
| 8,922,333 B1 | 12/2014 | Kirkjan |
| 8,922,370 B2 | 12/2014 | Picard |
| 8,923,513 B2 | 12/2014 | Guthery |
| 8,925,982 B2 | 1/2015 | Bliding |
| 8,928,453 B2 | 1/2015 | Sprenger |
| 8,943,562 B2 | 1/2015 | Guthery |
| 8,973,417 B2 | 3/2015 | Bench |
| 8,978,428 B2 | 3/2015 | Trent |
| 9,019,067 B2 | 4/2015 | Bryla |
| 9,024,720 B2 | 5/2015 | Bliding |
| 9,024,759 B2 | 5/2015 | Uyeda |
| 9,027,372 B2 | 5/2015 | Hickman |
| 9,032,058 B2 | 5/2015 | Guthery |
| 9,106,271 B2 | 8/2015 | Metivier |
| 9,147,151 B2 | 9/2015 | Robadey |
| 9,151,079 B2 | 10/2015 | Webb |
| 9,169,669 B2 | 10/2015 | Clary |
| 9,181,730 B1 | 11/2015 | Peng |
| 9,187,929 B2 | 11/2015 | Webb |
| 9,206,624 B2 | 12/2015 | Wheeler |
| 9,217,264 B2 | 12/2015 | Milton-Benoit |
| 9,218,696 B2 | 12/2015 | Dumas |
| 9,230,380 B2 | 1/2016 | Marsden |
| 9,267,583 B2 | 2/2016 | Narovlansky |
| 9,282,237 B2 | 3/2016 | Tamer |
| 9,290,964 B2 | 3/2016 | Trent |
| 9,290,965 B2 | 3/2016 | Hickman |
| 9,316,022 B2 | 4/2016 | Tyner |
| 9,316,024 B2 | 4/2016 | Münger |
| 9,322,194 B2 | 4/2016 | Cheng |
| 9,322,201 B1 | 4/2016 | Cheng |
| 9,326,094 B2 | 4/2016 | Johnson |
| 9,328,532 B2 | 5/2016 | Nguyen |
| 9,331,990 B2 | 5/2016 | Le Saint |
| 9,336,635 B2 | 5/2016 | Robertson |
| 9,355,511 B2 | 5/2016 | Hogan |
| 9,359,794 B2 | 6/2016 | Cheng |
| 9,382,739 B1 | 7/2016 | Johnson |
| 9,388,604 B2 | 7/2016 | Ferreira Sanchez |
| 9,390,572 B2 | 7/2016 | Almomani |
| 9,406,181 B2 | 8/2016 | Almomani |
| 9,424,700 B2 | 8/2016 | Lovett |
| 9,437,063 B2 | 9/2016 | Schoenfelder |
| 9,447,609 B2 | 9/2016 | Johnson |
| 9,460,612 B2 | 10/2016 | Vardi |
| 9,464,458 B2 | 10/2016 | Huang |
| 9,467,859 B2 | 10/2016 | Moss |
| 9,470,017 B1 | 10/2016 | Cheng |
| 9,470,018 B1 | 10/2016 | Cheng |
| 9,476,226 B2 | 10/2016 | Wheeler |
| 9,476,227 B2 | 10/2016 | Scheffler |
| 9,482,032 B2 | 11/2016 | Bedoian |
| 9,483,631 B2 | 11/2016 | Lowe |
| 9,487,971 B2 | 11/2016 | Quach |

(56) References Cited

U.S. PATENT DOCUMENTS

| | | | |
|---|---|---|---|
| 9,509,163 | B2 | 11/2016 | Corbin |
| 9,512,643 | B1 | 12/2016 | Keefe |
| 9,524,594 | B2 | 12/2016 | Ouyang |
| 9,528,294 | B2 | 12/2016 | Johnson |
| 9,528,296 | B1 | 12/2016 | Cheng |
| 9,528,299 | B2 | 12/2016 | Yoon |
| 9,530,262 | B2 | 12/2016 | Johnson |
| 9,530,264 | B2 | 12/2016 | Catering |
| 9,530,295 | B2 | 12/2016 | Johnson |
| 9,534,420 | B1 | 1/2017 | Cheng |
| 9,551,173 | B2 | 1/2017 | Helisten |
| 9,552,466 | B2 | 1/2017 | Lowe |
| 9,557,719 | B2 | 1/2017 | Liu |
| 9,563,997 | B2 | 2/2017 | Hsueh |
| 9,567,770 | B1 * | 2/2017 | Ginos .................. E05B 47/063 |
| 9,574,372 | B2 | 2/2017 | Johnson |
| 9,574,375 | B2 | 2/2017 | Henderson |
| 9,589,406 | B2 | 3/2017 | Borg |
| 9,594,889 | B2 | 3/2017 | Lowe |
| 9,595,148 | B2 | 3/2017 | Borg |
| 9,613,476 | B2 | 4/2017 | Johnson |
| 9,613,478 | B2 | 4/2017 | Dumas |
| 9,617,757 | B2 | 4/2017 | Lowder |
| 9,624,694 | B2 | 4/2017 | Kincaid |
| 9,624,695 | B1 | 4/2017 | Cheng |
| 9,631,920 | B2 | 4/2017 | Goldenson |
| 9,640,004 | B2 | 5/2017 | Lowder |
| 9,644,398 | B1 | 5/2017 | Cheng |
| 9,644,399 | B2 | 5/2017 | Johnson |
| 9,644,400 | B1 | 5/2017 | Cheng |
| 9,644,401 | B2 | 5/2017 | Nguyen |
| 9,646,445 | B2 | 5/2017 | Lu |
| 9,647,996 | B2 | 5/2017 | Johnson |
| 9,650,808 | B2 | 5/2017 | Martel |
| 9,652,911 | B2 | 5/2017 | Fedronic |
| 9,652,917 | B2 | 5/2017 | Johnson |
| 9,657,501 | B2 | 5/2017 | Armari |
| 9,659,424 | B2 | 5/2017 | Huber |
| 9,665,706 | B2 | 5/2017 | Zheng |
| 9,666,000 | B1 | 5/2017 | Schoenfelder |
| 9,670,696 | B2 | 6/2017 | Chong |
| 9,683,389 | B2 | 6/2017 | Pintar |
| 9,683,391 | B2 | 6/2017 | Johnson |
| 9,683,392 | B1 | 6/2017 | Cheng |
| 9,685,012 | B2 | 6/2017 | Saeedi |
| 9,685,015 | B2 | 6/2017 | Johnson |
| 9,685,017 | B2 | 6/2017 | Johnson |
| 9,685,018 | B2 | 6/2017 | Johnson |
| 9,690,272 | B2 | 6/2017 | Chin |
| 9,691,198 | B2 | 6/2017 | Cheng |
| 9,691,207 | B2 | 6/2017 | Almomani |
| 9,695,616 | B2 | 7/2017 | Johnson |
| 9,697,302 | B2 | 7/2017 | Nguyen |
| 9,697,658 | B1 | 7/2017 | Dumas |
| 9,697,661 | B1 | 7/2017 | Dumas |
| 9,704,314 | B2 | 7/2017 | Johnson |
| 9,704,320 | B2 | 7/2017 | Johnson |
| 9,704,321 | B1 | 7/2017 | Borg |
| 9,705,265 | B2 | 7/2017 | Lowder |
| 9,706,365 | B2 | 7/2017 | Johnson |
| 9,710,625 | B2 | 7/2017 | Lowe |
| 9,714,525 | B2 | 7/2017 | Eller |
| 9,721,076 | B2 | 8/2017 | Lowe |
| 9,721,413 | B2 | 8/2017 | Dumas |
| 9,725,927 | B1 | 8/2017 | Cheng |
| 9,727,328 | B2 | 8/2017 | Johnson |
| 9,728,023 | B2 | 8/2017 | Johnson |
| RE46,546 | E | 9/2017 | Schoepke et al. |
| 9,758,990 | B2 | 9/2017 | Beck |
| 9,758,991 | B2 | 9/2017 | Lin |
| 9,761,072 | B2 | 9/2017 | Arfwedson |
| 9,761,073 | B2 | 9/2017 | Cheng |
| 9,761,074 | B2 | 9/2017 | Cheng |
| 9,767,632 | B2 | 9/2017 | Johnson |
| 9,773,362 | B2 | 9/2017 | Davis |
| 9,779,570 | B2 | 10/2017 | Lee |
| 9,792,747 | B2 | 10/2017 | Baumgarte |
| 9,798,521 | B2 | 10/2017 | Love |
| 9,807,202 | B2 | 10/2017 | Baumgarte |
| 9,816,291 | B2 | 11/2017 | Wong |
| 9,818,247 | B2 | 11/2017 | Johnson |
| 9,822,553 | B1 | 11/2017 | Ho |
| 9,836,648 | B2 | 12/2017 | Perna |
| 9,845,617 | B2 | 12/2017 | Forsberg |
| 9,845,621 | B2 | 12/2017 | Lowder |
| 9,852,559 | B2 | 12/2017 | Rettig |
| 9,852,564 | B2 | 12/2017 | Henderson |
| 9,853,815 | B2 | 12/2017 | Zheng |
| 9,858,740 | B2 | 1/2018 | Borg |
| 9,875,350 | B2 | 1/2018 | Zheng |
| 9,877,199 | B1 | 1/2018 | Hu |
| 9,881,146 | B2 | 1/2018 | Zheng |
| 9,890,564 | B2 | 2/2018 | Wong |
| 9,905,066 | B2 | 2/2018 | Borg |
| 9,909,340 | B2 | 3/2018 | Bock |
| 9,916,746 | B2 | 3/2018 | Johnson |
| 9,920,552 | B2 | 3/2018 | Lowder |
| 9,922,481 | B2 | 3/2018 | Johnson |
| 9,934,637 | B2 | 4/2018 | Ribas |
| 9,945,156 | B2 | 4/2018 | Colman |
| 9,947,158 | B2 | 4/2018 | Baumgarte |
| 9,951,546 | B1 | 4/2018 | Maniaci |
| 9,957,733 | B2 | 5/2018 | Webb |
| 9,965,908 | B2 | 5/2018 | Ouyang |
| 9,972,151 | B2 | 5/2018 | Handville |
| 9,977,412 | B2 | 5/2018 | Lowder |
| 9,990,787 | B2 | 6/2018 | Capaldi-Tallon |
| 10,001,791 | B2 | 6/2018 | Lagerstedt |
| 10,017,962 | B2 | 7/2018 | Viviano |
| 10,017,963 | B2 | 7/2018 | Johnson |
| 10,019,861 | B2 | 7/2018 | Borg |
| 10,026,247 | B2 | 7/2018 | Anderson |
| 10,033,972 | B2 | 7/2018 | Almomani |
| 10,037,636 | B2 | 7/2018 | Ho |
| 10,049,520 | B2 | 8/2018 | Gardiner |
| 10,060,167 | B2 | 8/2018 | Romero |
| 10,062,225 | B2 | 8/2018 | Borg |
| 10,062,257 | B2 | 8/2018 | Chau |
| 10,074,224 | B2 | 9/2018 | Ho |
| 10,077,577 | B2 | 9/2018 | Webb |
| 10,078,931 | B2 | 9/2018 | Lowder |
| 10,083,559 | B2 | 9/2018 | Schoenfelder |
| 10,087,652 | B2 | 10/2018 | Snider |
| 10,087,654 | B2 | 10/2018 | Nguyen |
| 10,094,141 | B2 | 10/2018 | Helisten |
| 10,094,143 | B2 | 10/2018 | Lowder |
| 10,096,182 | B2 | 10/2018 | Prasad |
| 10,100,552 | B2 | 10/2018 | Wheeler |
| 10,126,371 | B2 | 11/2018 | Jonsson |
| 10,128,283 | B2 | 11/2018 | Bryla |
| 10,134,211 | B2 | 11/2018 | Hogan |
| 10,140,794 | B2 | 11/2018 | Rettig |
| 10,140,828 | B2 | 11/2018 | Johnson |
| 10,145,147 | B2 | 12/2018 | Ferreira |
| 10,147,255 | B1 | 12/2018 | Rais |
| 10,152,838 | B2 | 12/2018 | Einberg |
| 10,163,285 | B2 | 12/2018 | Schoenfelder |
| 10,174,523 | B2 | 1/2019 | Quach |
| 10,176,653 | B2 | 1/2019 | Conlin |
| 10,176,687 | B2 | 1/2019 | Almomani |
| 10,184,269 | B2 | 1/2019 | Skogstrom |
| 10,184,272 | B2 | 1/2019 | Lee |
| 10,190,338 | B2 | 1/2019 | Matyko |
| 10,192,380 | B2 | 1/2019 | Borg |
| 10,192,383 | B2 | 1/2019 | Aase |
| 10,198,884 | B2 | 2/2019 | Johnson |
| 10,212,144 | B2 | 2/2019 | Guthery |
| 10,227,818 | B2 | 3/2019 | Kincaid |
| 10,228,444 | B2 | 3/2019 | Jonsson |
| 10,240,363 | B2 | 3/2019 | Hsu |
| 10,240,365 | B2 | 3/2019 | Almomani |
| 10,240,366 | B2 | 3/2019 | Sotes Delgado |
| 10,246,906 | B2 | 4/2019 | Lin |
| 10,248,898 | B2 | 4/2019 | Brown |

(56) References Cited

U.S. PATENT DOCUMENTS

| | | | |
|---|---|---|---|
| 10,255,732 | B2 | 4/2019 | Prasad |
| 10,264,906 | B2 | 4/2019 | Bloom |
| 10,269,202 | B2 | 4/2019 | Denison |
| 10,270,372 | B2 | 4/2019 | Webb |
| 10,273,718 | B2 | 4/2019 | Cannella |
| 10,282,930 | B2 | 5/2019 | Borg |
| 10,304,273 | B2 | 5/2019 | Johnson |
| 10,309,125 | B2 | 6/2019 | Beck |
| 10,313,491 | B2 | 6/2019 | Baumgarte |
| 10,319,165 | B2 | 6/2019 | Gengler |
| 10,337,217 | B2 | 7/2019 | Hogan |
| 10,339,736 | B2 | 7/2019 | Sivalingam |
| 10,339,738 | B2 | 7/2019 | Hosey |
| 10,344,501 | B2 | 7/2019 | Chang |
| 10,352,067 | B2 | 7/2019 | Cahill |
| 10,378,238 | B2 | 8/2019 | Beck |
| 10,378,244 | B2 | 8/2019 | Lowder |
| 10,382,608 | B2 | 8/2019 | Gerhardt |
| 10,385,589 | B2 | 8/2019 | Matosian |
| 10,388,094 | B2 | 8/2019 | Johnson |
| 10,397,013 | B1 | 8/2019 | Hill |
| 10,400,475 | B2 * | 9/2019 | Klammer .............. E05B 49/006 |
| 10,400,477 | B2 | 9/2019 | Moon |
| 10,400,479 | B2 | 9/2019 | Kang |
| 10,403,072 | B2 | 9/2019 | Earles |
| 10,407,942 | B2 | 9/2019 | Romero |
| 10,415,269 | B2 * | 9/2019 | Holmes ................. E05B 47/063 |
| 10,417,848 | B2 | 9/2019 | Borg |
| 10,435,917 | B2 | 10/2019 | Nunez |
| 10,438,426 | B2 | 10/2019 | Prasad |
| 10,438,428 | B2 | 10/2019 | Rettig |
| 10,438,463 | B2 | 10/2019 | Lovejoy |
| 10,443,266 | B2 | 10/2019 | Johnson |
| 10,443,267 | B2 | 10/2019 | Tobias |
| 10,445,999 | B2 | 10/2019 | Johnson |
| 10,450,778 | B2 | 10/2019 | Bennett |
| 10,458,152 | B2 | 10/2019 | Schort |
| 10,465,420 | B2 | 11/2019 | Heisler |
| 10,465,421 | B2 | 11/2019 | Webb |
| 10,472,855 | B2 | 11/2019 | Hsu |
| 10,487,543 | B2 | 11/2019 | Sanford |
| 10,490,000 | B2 | 11/2019 | Schoenfelder |
| 10,490,006 | B2 | 11/2019 | Einberg |
| 10,490,008 | B2 | 11/2019 | Mukundala |
| 10,508,472 | B2 | 12/2019 | Piantek |
| 10,515,495 | B2 | 12/2019 | Schoenfelder |
| 10,515,498 | B2 | 12/2019 | Chang |
| 10,519,694 | B2 | 12/2019 | Lin |
| 10,526,813 | B2 | 1/2020 | Bliding |
| 10,526,816 | B2 | 1/2020 | Chiou |
| 10,529,161 | B2 | 1/2020 | Ma |
| 10,533,343 | B2 | 1/2020 | Gartner |
| 10,563,424 | B2 | 2/2020 | Kim |
| 10,565,809 | B2 | 2/2020 | Gilbertson |
| 10,570,645 | B2 | 2/2020 | Ellis |
| 10,573,109 | B2 | 2/2020 | Lu |
| 10,573,450 | B2 | 2/2020 | Davis |
| 10,580,240 | B2 | 3/2020 | Caterino |
| 10,615,721 | B2 | 4/2020 | Webb |
| 10,619,380 | B2 | 4/2020 | Ahearn |
| 10,636,234 | B2 | 4/2020 | Lee |
| 10,643,412 | B1 | 5/2020 | Yang |
| 10,643,414 | B2 | 5/2020 | Davis |
| 10,655,363 | B2 | 5/2020 | Piantek |
| 10,666,912 | B2 | 5/2020 | Almomani |
| 10,669,745 | B2 | 6/2020 | Liddell |
| 10,673,993 | B2 | 6/2020 | Baumgarte |
| 10,676,963 | B2 | 6/2020 | Vasudevan |
| 10,679,111 | B2 | 6/2020 | Brown |
| 10,683,677 | B1 | 6/2020 | Funamura |
| 10,685,102 | B2 | 6/2020 | Vanblon |
| 10,691,953 | B2 | 6/2020 | Johnson |
| 10,692,316 | B2 | 6/2020 | Clouser |
| 10,692,343 | B2 | 6/2020 | Sadek |
| 10,704,293 | B2 | 7/2020 | Almomani |
| 10,708,251 | B2 | 7/2020 | Steiner |
| 10,713,868 | B2 | 7/2020 | Gengler |
| 10,721,443 | B1 | 7/2020 | Assani |
| 10,724,275 | B2 | 7/2020 | Curtis |
| 10,726,654 | B2 | 7/2020 | Siklosi |
| 10,731,380 | B2 | 8/2020 | Beck |
| 10,738,504 | B2 | 8/2020 | Uyeda |
| 10,742,142 | B2 | 8/2020 | Forsberg |
| 10,748,360 | B2 | 8/2020 | Telljohann |
| 10,783,731 | B2 | 9/2020 | Imanuel |
| 10,791,106 | B2 | 9/2020 | Guthery |
| 10,808,420 | B2 | 10/2020 | Morstatt |
| 10,808,424 | B2 | 10/2020 | Criddle |
| 10,810,307 | B2 | 10/2020 | Brown |
| 10,815,693 | B2 | 10/2020 | Yurasits |
| 10,815,695 | B2 | 10/2020 | Shaffer |
| D901,278 | S | 11/2020 | Zheng |
| 10,822,833 | B2 | 11/2020 | Mackle |
| 10,829,959 | B2 | 11/2020 | Lowder |
| 10,845,437 | B2 | 11/2020 | Long |
| 10,846,957 | B2 | 11/2020 | Cheng |
| 10,858,864 | B2 | 12/2020 | Pfunder |
| 10,865,595 | B2 | 12/2020 | Coleman |
| 10,866,799 | B2 | 12/2020 | Coolidge |
| 10,867,459 | B2 | 12/2020 | Ahearn |
| 10,872,483 | B2 | 12/2020 | Schoenfelder |
| 10,878,650 | B1 | 12/2020 | Meruva |
| 10,885,733 | B2 | 1/2021 | Lopez |
| 10,885,734 | B2 | 1/2021 | Schoenfelder |
| 10,891,810 | B2 | 1/2021 | Sylwan |
| 10,895,094 | B2 | 1/2021 | Li |
| 10,904,837 | B2 | 1/2021 | Kincaid |
| 10,907,381 | B2 | 2/2021 | Lien |
| 10,909,792 | B2 | 2/2021 | Schoenfelder |
| 10,911,388 | B2 | 2/2021 | Ring |
| 10,916,899 | B1 | 2/2021 | Baldwin |
| 10,930,096 | B2 | 2/2021 | Rettig |
| 10,930,097 | B2 | 2/2021 | Brown |
| 10,947,756 | B2 | 3/2021 | Vanmeter |
| 10,970,983 | B2 | 4/2021 | Johnson |
| 10,977,919 | B2 | 4/2021 | Johnson |
| 10,988,957 | B2 | 4/2021 | Lowder |
| 10,993,111 | B2 | 4/2021 | Johnson |
| 11,002,039 | B2 | 5/2021 | Roatis |
| 11,002,061 | B1 | 5/2021 | Maiga |
| 11,008,778 | B2 | 5/2021 | Ho |
| 11,010,463 | B2 | 5/2021 | Zheng |
| 11,010,995 | B2 | 5/2021 | Davis |
| 11,011,002 | B2 | 5/2021 | Lundberg |
| 11,015,369 | B2 | 5/2021 | Baty |
| 11,030,837 | B2 | 6/2021 | Strömberg |
| 11,043,055 | B2 | 6/2021 | Johnson |
| 11,060,323 | B2 | 7/2021 | Almomani |
| 11,062,539 | B2 | 7/2021 | Nguyen |
| 11,062,542 | B2 | 7/2021 | Lundberg |
| 11,069,167 | B2 | 7/2021 | Einberg |
| 11,069,219 | B2 | 7/2021 | London |
| 11,072,944 | B2 | 7/2021 | Peng |
| 11,072,945 | B2 | 7/2021 | Johnson |
| 11,078,687 | B2 | 8/2021 | Mack |
| 11,080,951 | B2 | 8/2021 | Kirkjan |
| 11,091,936 | B2 | 8/2021 | Beck |
| 11,093,589 | B2 | 8/2021 | Lowe |
| 11,094,153 | B2 | 8/2021 | Einberg |
| 11,105,121 | B2 | 8/2021 | Rai |
| 11,111,697 | B2 | 9/2021 | Overgaard |
| 11,124,990 | B2 | 9/2021 | Frolov |
| 11,124,997 | B2 | 9/2021 | Eickhoff |
| 11,131,120 | B2 | 9/2021 | Chang |
| 11,136,788 | B2 | 10/2021 | Telljohann |
| 11,136,790 | B2 | 10/2021 | Caterino |
| 11,145,149 | B2 | 10/2021 | Jeng |
| 11,151,816 | B2 | 10/2021 | Schoenfelder |
| 11,156,020 | B2 | 10/2021 | Lin |
| 11,156,021 | B2 | 10/2021 | Guma |
| 11,158,146 | B2 | 10/2021 | Cahill |
| 11,164,408 | B2 | 11/2021 | Bryla |
| 11,170,079 | B2 | 11/2021 | Lowe |
| 11,187,012 | B2 | 11/2021 | Ellis |

(56) References Cited

U.S. PATENT DOCUMENTS

| | | |
|---|---|---|
| 11,189,120 B2 | 11/2021 | Amuduri et al. |
| 11,193,306 B2 * | 12/2021 | Pfunder ................ E05B 49/002 |
| 11,199,042 B2 | 12/2021 | Hall |
| 11,199,046 B2 | 12/2021 | Kincaid |
| 11,200,574 B2 | 12/2021 | Bloom |
| 11,203,890 B2 | 12/2021 | Davis |
| 11,214,982 B2 | 1/2022 | Raatikainen |
| 11,214,986 B2 | 1/2022 | Emma |
| 11,220,843 B2 | 1/2022 | Harkonen |
| 11,220,844 B2 | 1/2022 | Imanuel |
| 11,222,495 B2 | 1/2022 | Schoenfelder |
| 11,232,660 B2 | 1/2022 | Strömberg |
| 11,236,525 B2 | 2/2022 | Ali |
| 11,237,243 B2 | 2/2022 | Jonsson |
| 11,243,655 B2 | 2/2022 | Schoenfelder |
| 11,248,395 B2 | 2/2022 | Stein |
| 11,248,396 B2 | 2/2022 | Lammers |
| 11,257,314 B2 | 2/2022 | Von Zwehl |
| 11,263,205 B2 | 3/2022 | Vickrey |
| 11,268,300 B2 | 3/2022 | Langenberg |
| 11,270,536 B2 | 3/2022 | Strömberg |
| 11,275,820 B2 | 3/2022 | Kalous |
| 11,282,311 B2 | 3/2022 | Comerford |
| 11,282,314 B2 | 3/2022 | Schoenfelder |
| 11,286,691 B2 | 3/2022 | Kurki |
| 11,287,900 B2 | 3/2022 | Gibbins |
| 11,295,298 B2 | 4/2022 | Neafsey |
| 11,295,568 B2 | 4/2022 | Imanuel |
| 11,295,586 B2 | 4/2022 | Jonsson |
| 11,302,130 B2 | 4/2022 | Liao |
| 11,302,336 B2 | 4/2022 | Langenberg |
| 11,306,525 B2 | 4/2022 | Seppänen |
| 11,308,742 B2 | 4/2022 | Jonsson |
| 11,313,665 B2 | 4/2022 | Caterino |
| 11,315,355 B2 | 4/2022 | Lu |
| 11,328,543 B2 | 5/2022 | Lundberg |
| 11,335,147 B2 | 5/2022 | Long |
| 11,348,396 B2 | 5/2022 | Meruva |
| 11,352,812 B2 | 6/2022 | Johnson |
| 11,356,642 B2 | 6/2022 | Almomani |
| 11,359,408 B2 | 6/2022 | Kim |
| 11,361,060 B1 | 6/2022 | Lyman |
| 11,371,262 B2 | 6/2022 | Ainley |
| 11,373,467 B2 | 6/2022 | Jonsson |
| 11,373,471 B2 | 6/2022 | Anderson |
| 11,373,497 B2 | 6/2022 | Basilious |
| 11,377,875 B2 | 7/2022 | Martin |
| 11,377,887 B2 | 7/2022 | Cote |
| 11,380,497 B2 | 7/2022 | Treger |
| 11,384,567 B2 | 7/2022 | Derakhshan |
| 11,391,064 B2 | 7/2022 | Almomani |
| 11,391,067 B2 | 7/2022 | George |
| 11,395,138 B2 | 7/2022 | Pernyer |
| 11,401,733 B2 | 8/2022 | Brown |
| 11,403,900 B2 | 8/2022 | Strömberg |
| 11,403,902 B2 | 8/2022 | Ho |
| 11,408,202 B2 | 8/2022 | Uyeda |
| 11,414,889 B2 | 8/2022 | Shaw |
| 11,417,158 B2 | 8/2022 | Fu |
| 11,417,159 B2 | 8/2022 | Li |
| 11,421,445 B2 | 8/2022 | Johnson |
| 11,425,546 B2 | 8/2022 | Ahearn |
| 11,430,276 B1 | 8/2022 | McLachlan |
| 11,435,847 B2 | 9/2022 | Setter |
| 11,436,879 B2 | 9/2022 | Cheng |
| 11,441,331 B2 | 9/2022 | Li |
| 11,443,572 B2 | 9/2022 | Kusanale |
| 11,472,428 B2 | 10/2022 | Kanoh |
| 11,485,632 B2 | 11/2022 | Ros |
| 2001/0010166 A1 | 8/2001 | Doucet |
| 2001/0028172 A1 | 10/2001 | Bates |
| 2002/0056300 A1 | 5/2002 | Pierre |
| 2002/0092331 A1 | 7/2002 | Huang |
| 2002/0095963 A1 | 7/2002 | Doerr |
| 2002/0101083 A1 | 8/2002 | Toledano |
| 2003/0164763 A1 | 9/2003 | Hisano |
| 2003/0200778 A1 | 10/2003 | Chhatwal |
| 2003/0209042 A1 | 11/2003 | Yeh |
| 2003/0217574 A1 | 11/2003 | Meis |
| 2004/0039920 A1 | 2/2004 | Kim |
| 2004/0045330 A1 | 3/2004 | Moon |
| 2004/0178909 A1 | 9/2004 | Lu |
| 2005/0006908 A1 | 1/2005 | Bruwer |
| 2005/0103066 A1 | 5/2005 | Botha |
| 2005/0132766 A1 | 6/2005 | Milo |
| 2005/0179517 A1 | 8/2005 | Harms |
| 2005/0183480 A1 | 8/2005 | Hingston |
| 2005/0184865 A1 | 8/2005 | Han |
| 2006/0001522 A1 | 1/2006 | Moon |
| 2006/0022794 A1 | 2/2006 | Determan |
| 2006/0038654 A1 | 2/2006 | Khalil |
| 2006/0112747 A1 | 6/2006 | Moon |
| 2006/0129407 A1 | 6/2006 | Lee |
| 2006/0144103 A1 | 7/2006 | Blanch |
| 2006/0196238 A1 | 9/2006 | Avni |
| 2006/0283219 A1 | 12/2006 | Bendz |
| 2007/0013476 A1 | 1/2007 | Petrovic |
| 2007/0018790 A1 | 1/2007 | Lafrance |
| 2007/0051145 A1 | 3/2007 | Chang |
| 2007/0103277 A1 | 5/2007 | Yuk |
| 2007/0245369 A1 | 10/2007 | Thompson |
| 2007/0267489 A1 | 11/2007 | Borodulin |
| 2008/0055040 A1 | 3/2008 | Lizza |
| 2008/0079580 A1 | 4/2008 | Shelton |
| 2008/0127686 A1 | 6/2008 | Hwang |
| 2008/0150684 A1 | 6/2008 | Gartner |
| 2008/0236214 A1 | 10/2008 | Han |
| 2008/0244759 A1 | 10/2008 | Cao |
| 2009/0152875 A1 | 6/2009 | Gray |
| 2009/0193859 A1 | 8/2009 | Kwon |
| 2009/0229321 A1 | 9/2009 | Eccles |
| 2009/0320538 A1 | 12/2009 | Pellaton |
| 2009/0324025 A1 | 12/2009 | Camp, Jr. |
| 2010/0026489 A1 | 2/2010 | Jordan |
| 2010/0307206 A1 | 12/2010 | Taylor |
| 2010/0313615 A1 | 12/2010 | Chen |
| 2010/0328089 A1 | 12/2010 | Eichenstein |
| 2011/0074543 A1 | 3/2011 | Kaczmarz |
| 2011/0084799 A1 | 4/2011 | Ficko |
| 2011/0148631 A1 | 6/2011 | Lanham |
| 2012/0270496 A1 | 10/2012 | Kuenzi |
| 2012/0280790 A1 | 11/2012 | Gerhardt |
| 2012/0292925 A1 | 11/2012 | Lundberg |
| 2013/0169411 A1 | 7/2013 | Chan |
| 2013/0307691 A1 | 11/2013 | Sendin |
| 2013/0342314 A1 | 12/2013 | Chen |
| 2014/0077929 A1 | 3/2014 | Dumas |
| 2014/0145823 A1 | 5/2014 | Aase |
| 2014/0152831 A1 | 6/2014 | Yang |
| 2014/0218167 A1 | 8/2014 | Tseng |
| 2014/0266715 A1 | 9/2014 | Manikandan |
| 2015/0042105 A1 | 2/2015 | Promutico |
| 2015/0159401 A1 | 6/2015 | Patrick |
| 2015/0162994 A1 | 6/2015 | Rodzevski |
| 2015/0248796 A1 | 9/2015 | Iyer |
| 2015/0269799 A1 | 9/2015 | Martinez |
| 2015/0292240 A1 | 10/2015 | Ribas |
| 2016/0005248 A1 | 1/2016 | Aase |
| 2016/0017640 A1 | 1/2016 | Soloway |
| 2016/0042582 A1 | 2/2016 | Hyde |
| 2016/0189511 A1 | 6/2016 | Peterson |
| 2016/0298367 A1 | 10/2016 | Dintheer |
| 2016/0319569 A1 | 11/2016 | Johnson |
| 2016/0319571 A1 | 11/2016 | Johnson |
| 2016/0343184 A1 | 11/2016 | Dumas |
| 2016/0353239 A1 | 12/2016 | Kjellsson |
| 2016/0358433 A1 | 12/2016 | Johnson |
| 2016/0366374 A1 | 12/2016 | Carter |
| 2017/0039361 A1 | 2/2017 | Zheng |
| 2017/0061095 A1 | 3/2017 | Waskin |
| 2017/0204636 A1 | 7/2017 | Sack |
| 2017/0227315 A1 | 8/2017 | Milde, Jr. |
| 2017/0228603 A1 | 8/2017 | Johnson |
| 2017/0242532 A1 | 8/2017 | Zheng |

(56) References Cited

U.S. PATENT DOCUMENTS

| | | |
|---|---|---|
| 2017/0243416 A1 | 8/2017 | Chen |
| 2017/0298654 A1 | 10/2017 | Holmes |
| 2017/0332055 A1 | 11/2017 | Henderson |
| 2018/0096593 A1 | 4/2018 | Davis |
| 2018/0135336 A1 | 5/2018 | Johnson |
| 2018/0155959 A1 | 6/2018 | Hartung |
| 2018/0266145 A1 | 9/2018 | Chou |
| 2018/0268675 A1 | 9/2018 | Johnson |
| 2018/0283044 A1 | 10/2018 | Morstatt |
| 2018/0283047 A1 | 10/2018 | Huang |
| 2018/0283051 A1 | 10/2018 | Qiu |
| 2018/0298640 A1 | 10/2018 | Caterino |
| 2018/0320413 A1 | 11/2018 | Wong |
| 2018/0357845 A1 | 12/2018 | Berg |
| 2019/0019364 A9 | 1/2019 | Cheng |
| 2019/0130687 A1 | 5/2019 | Johnson |
| 2019/0139343 A1 | 5/2019 | Lien |
| 2019/0145130 A1 | 5/2019 | Affan |
| 2019/0158353 A1 | 5/2019 | Johnson |
| 2019/0169874 A1 | 6/2019 | Gengler |
| 2019/0178003 A1 | 6/2019 | Martin |
| 2019/0234111 A1 | 8/2019 | Riley |
| 2019/0257116 A1 | 8/2019 | Coster |
| 2019/0264465 A1 | 8/2019 | Adje |
| 2019/0309539 A1 | 10/2019 | Mukundala |
| 2019/0323261 A1 | 10/2019 | McGrath |
| 2019/0327098 A1 | 10/2019 | Hart |
| 2019/0355195 A1 | 11/2019 | Hu |
| 2019/0360238 A1 | 11/2019 | Liu |
| 2020/0002977 A1 | 1/2020 | Russi-Vigoya |
| 2020/0080343 A1 | 3/2020 | Uyeda |
| 2020/0090438 A1 | 3/2020 | Cöster |
| 2020/0123808 A1 | 4/2020 | Lovejoy |
| 2020/0123813 A1 | 4/2020 | Romero |
| 2020/0141155 A1 | 5/2020 | Lammers |
| 2020/0153288 A1 | 5/2020 | Baumgarte |
| 2020/0219347 A1 | 7/2020 | Lv |
| 2020/0232254 A1 | 7/2020 | Mani |
| 2020/0302717 A1 | 9/2020 | Chen |
| 2020/0354991 A1 | 11/2020 | Derham |
| 2020/0362592 A1 | 11/2020 | Jonsson |
| 2020/0399932 A1 | 12/2020 | Ibon |
| 2020/0402335 A1 | 12/2020 | Schoenfelder |
| 2020/0402741 A1 | 12/2020 | Huang |
| 2021/0005036 A1 | 1/2021 | Johnson |
| 2021/0010293 A1 | 1/2021 | Almomani |
| 2021/0019970 A1 | 1/2021 | Strömberg |
| 2021/0026936 A1 | 1/2021 | Zheng |
| 2021/0034882 A1 | 2/2021 | Johnson |
| 2021/0035391 A1 | 2/2021 | Einberg |
| 2021/0040772 A1 | 2/2021 | Kim |
| 2021/0049845 A1 | 2/2021 | Schoenfelder |
| 2021/0049851 A1 | 2/2021 | Schoenfelder |
| 2021/0062545 A1 | 3/2021 | Arbegard |
| 2021/0071440 A1 | 3/2021 | Saeedi |
| 2021/0074096 A1 | 3/2021 | Cheng |
| 2021/0074105 A1 | 3/2021 | Imanuel |
| 2021/0079691 A1 | 3/2021 | Sundkvist |
| 2021/0140199 A1 | 5/2021 | Bliding |
| 2021/0142601 A1 | 5/2021 | Schoenfelder |
| 2021/0156169 A1 | 5/2021 | Uyeda |
| 2021/0156171 A1 | 5/2021 | Uyeda |
| 2021/0159634 A1 | 5/2021 | Uyeda |
| 2021/0164263 A1 | 6/2021 | Brown |
| 2021/0164264 A1 | 6/2021 | McKibben |
| 2021/0172203 A1 | 6/2021 | Martin |
| 2021/0189764 A1 | 6/2021 | Kincaid |
| 2021/0189769 A1 | 6/2021 | Sieglaar |
| 2021/0192877 A1 | 6/2021 | Stenlund |
| 2021/0193979 A1 | 6/2021 | Learmonth |
| 2021/0201606 A1 | 7/2021 | Strömberg |
| 2021/0207401 A1 | 7/2021 | Cook |
| 2021/0207424 A1 | 7/2021 | Kim |
| 2021/0207431 A1 | 7/2021 | Kim |
| 2021/0214972 A1 | 7/2021 | Szczerkowski |
| 2021/0222458 A1 | 7/2021 | Jones |
| 2021/0225100 A1 | 7/2021 | Jones |
| 2021/0227388 A1 | 7/2021 | Johnson |
| 2021/0241559 A1 | 8/2021 | Lundberg |
| 2021/0241606 A1 | 8/2021 | Kinney |
| 2021/0248884 A1 | 8/2021 | Dougan |
| 2021/0251182 A1 | 8/2021 | Anderson |
| 2021/0255712 A1 | 8/2021 | Gibbins |
| 2021/0264707 A1 | 8/2021 | Strömberg |
| 2021/0279983 A1 | 9/2021 | Imanuel |
| 2021/0280031 A1 | 9/2021 | Johnson |
| 2021/0285255 A1 | 9/2021 | Tinker |
| 2021/0285257 A1 | 9/2021 | Ohl |
| 2021/0324660 A1 | 10/2021 | Maiga |
| 2021/0348418 A1 | 11/2021 | Lu |
| 2021/0372165 A1 | 12/2021 | Ryan |
| 2021/0396046 A1 | 12/2021 | Johnson |
| 2021/0404216 A1 | 12/2021 | Tan |
| 2021/0407229 A1 | 12/2021 | Schoenfelder |
| 2022/0005296 A1 | 1/2022 | Einberg |
| 2022/0010586 A1 | 1/2022 | Romero |
| 2022/0018161 A1 | 1/2022 | Guma |
| 2022/0019982 A1 | 1/2022 | Ramachandran |
| 2022/0020234 A1 | 1/2022 | Schoenfelder |
| 2022/0025675 A1 | 1/2022 | Chan |
| 2022/0028198 A1 | 1/2022 | Lundberg |
| 2022/0034125 A1 | 2/2022 | Moon |
| 2022/0042349 A1 | 2/2022 | Barnett, III |
| 2022/0046094 A1 | 2/2022 | Hart |
| 2022/0051496 A1 | 2/2022 | Einberg |
| 2022/0051498 A1 | 2/2022 | Hart |
| 2022/0051499 A1 | 2/2022 | Schwartz |
| 2022/0058900 A1 | 2/2022 | Earles |
| 2022/0065023 A1 | 3/2022 | Paulsson |
| 2022/0068059 A1 | 3/2022 | Nguyen |
| 2022/0068063 A1 | 3/2022 | Töngi |
| 2022/0076513 A1 | 3/2022 | Burge |
| 2022/0081936 A1 | 3/2022 | Petty |
| 2022/0081938 A1 | 3/2022 | Beck |
| 2022/0092896 A1 | 3/2022 | Jonsson |
| 2022/0098898 A1 | 3/2022 | Alvarez |
| 2022/0101672 A1 | 3/2022 | Abueshsheikh |
| 2022/0101706 A1 | 3/2022 | Abueshsheikh |
| 2022/0106813 A1 | 4/2022 | Von Matern |
| 2022/0106814 A1 | 4/2022 | Morstatt |
| 2022/0108572 A1 | 4/2022 | Lovett |
| 2022/0122393 A1 | 4/2022 | Park |
| 2022/0122400 A1 | 4/2022 | Jonsson |
| 2022/0130193 A1 | 4/2022 | Singh |
| 2022/0157106 A1 | 5/2022 | Pirch |
| 2022/0178170 A1 | 6/2022 | Lin |
| 2022/0178171 A1 | 6/2022 | Zheng |
| 2022/0186524 A1 | 6/2022 | Guerard |
| 2022/0189225 A1 | 6/2022 | Martinez Sanchez |
| 2022/0198854 A1 | 6/2022 | Kübler |
| 2022/0198863 A1 | 6/2022 | Ho |
| 2022/0222996 A1 | 7/2022 | Einberg |
| 2022/0228399 A1 | 7/2022 | Lin |
| 2022/0251874 A1 | 8/2022 | Cederblad |
| 2022/0254212 A1 | 8/2022 | Schoenfelder |
| 2022/0268056 A1 | 8/2022 | Pfunder |

OTHER PUBLICATIONS

Press Release regarding Schlage SecureKey, Dated Jun. 17, 2010, 2 pages.

Wikipedia entry, KeyMe, Dated Mar. 20, 2019, 2 pages.

* cited by examiner

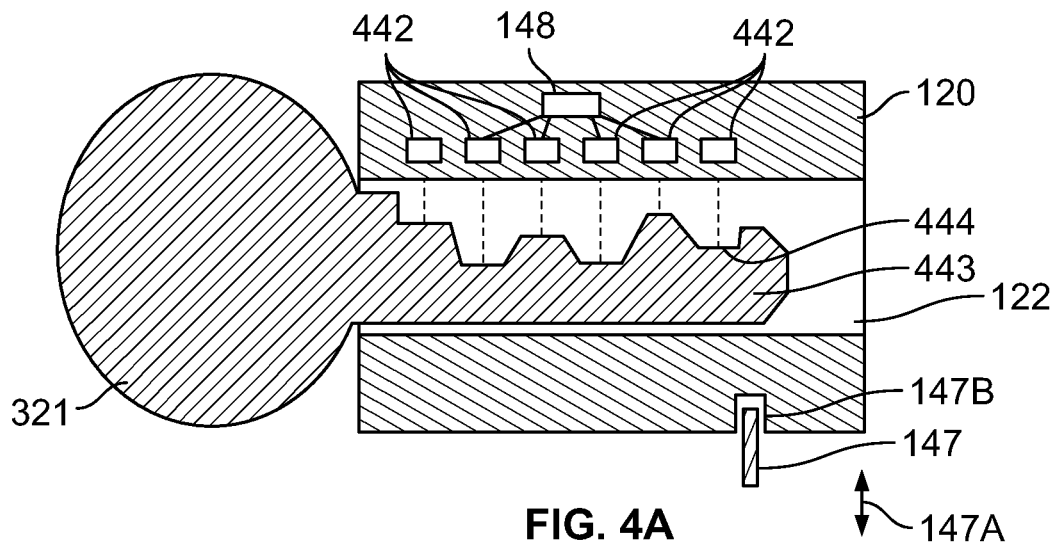
FIG. 4A
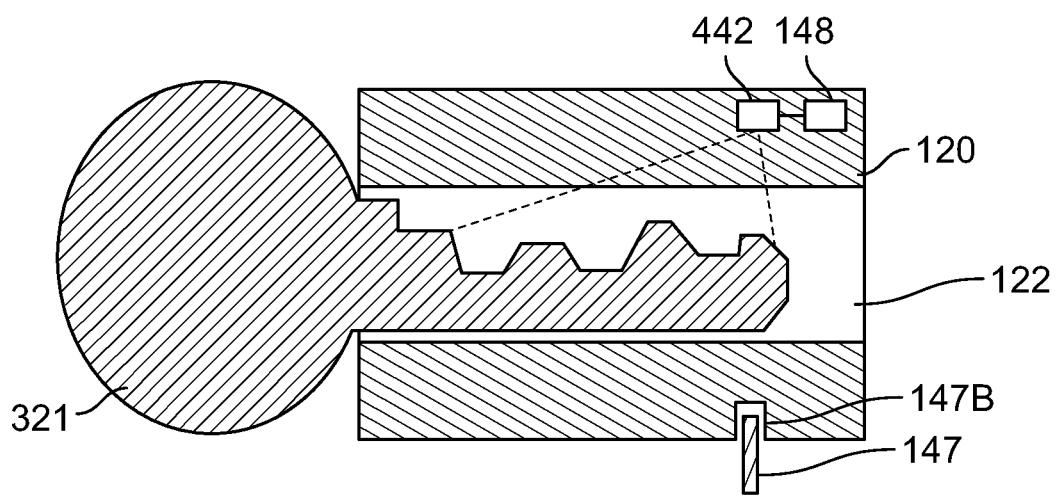
FIG. 4B
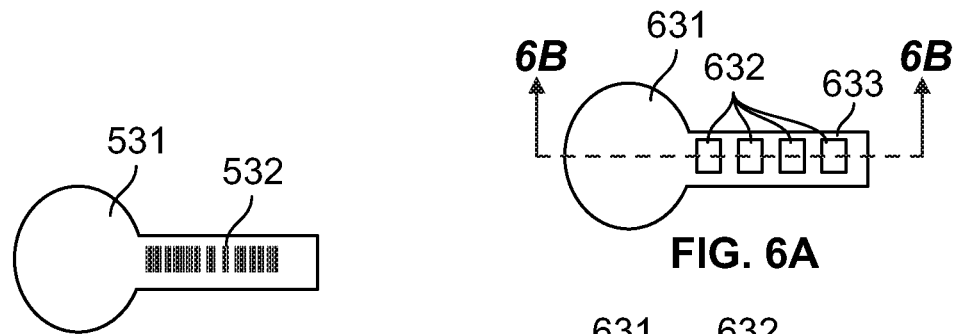
FIG. 5
FIG. 6A
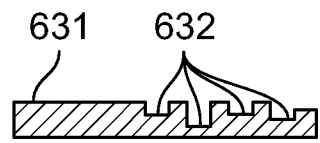
FIG. 6B

ACCESS CONTROL SYSTEM AND METHOD

FIELD

This disclosure relates to locks and, more specifically, to a system and method for controlling authorization to operate a lock.

BACKGROUND

Some pin tumbler locks have a series of key pins that extend into a keyway of a core of the lock. Each key pin is backed by a driver pin. In order to open the lock, the key pins must be shifted by a key inserted into the keyway until the interface between each key pin and the associated driver pin aligns with a shear line of the core, allowing the core to be rotated. The core is connected to a deadbolt or deadlatch of the lock so that turning of the core retracts the bolt or latch of the lock.

Keys are cut to have bitting with peaks and valleys that may each be configured to align with a specific key pin when inserted into the lock. As such, only a key with the correct bitting will shift each key pin by the distance required to align the interfaces between the key pins and the driver pins with the shear line of the core and permit the core to be turned. The key has a head that projects outward from the keyhole, providing a grip the user can use to manually rotate the core in order to retract the deadbolt of the lock.

Pin tumbler locks can be operated without an authorized key by picking or bumping the key pins so that the gaps between the key pins and driver pins are aligned with the shear line of the core. Both bumping and picking involves inserting an object other than the authorized key into the keyhole, and contacting the key pins to shift them relative to the core. In some picking methods, an object is used to gradually rotate the core, causing the key pins to partially bind while the key pins are manipulated into a position where the key pins permit turning of the plug. As such, unauthorized individuals may gain access to secured areas by forcing open pin tumbler locks using bumping or picking techniques.

The security of a lock can further be compromised when an authorized key is acquired by an unauthorized individual, such as if the authorized key is lost or stolen, and the unauthorized individual knows or ascertains the location of the lock. In order to update the lock to no longer be opened by the key, the lock may be disassembled so that the lock can be reconfigured such as by replacing existing key pins with key pins of different lengths. This re-keying of a lock is inconvenient and labor-intensive.

BRIEF DESCRIPTION OF THE DRAWINGS

FIGS. 4A-4B are cross-sectional views of the lock of FIG. 1 taken along the line 4-4 illustrating different embodiments of the electromagnetic radiation sensor;

FIG. 5 is an elevational view of an example key for use in a lock with an electromagnetic radiation sensor;

FIG. 6A is an elevational view of another example key for use in a lock with electromagnetic radiation sensor;

FIG. 6B is a cross-sectional view of the key of FIG. 6A taken along the line 6B-6B.

DETAILED DESCRIPTION

Figure 1:
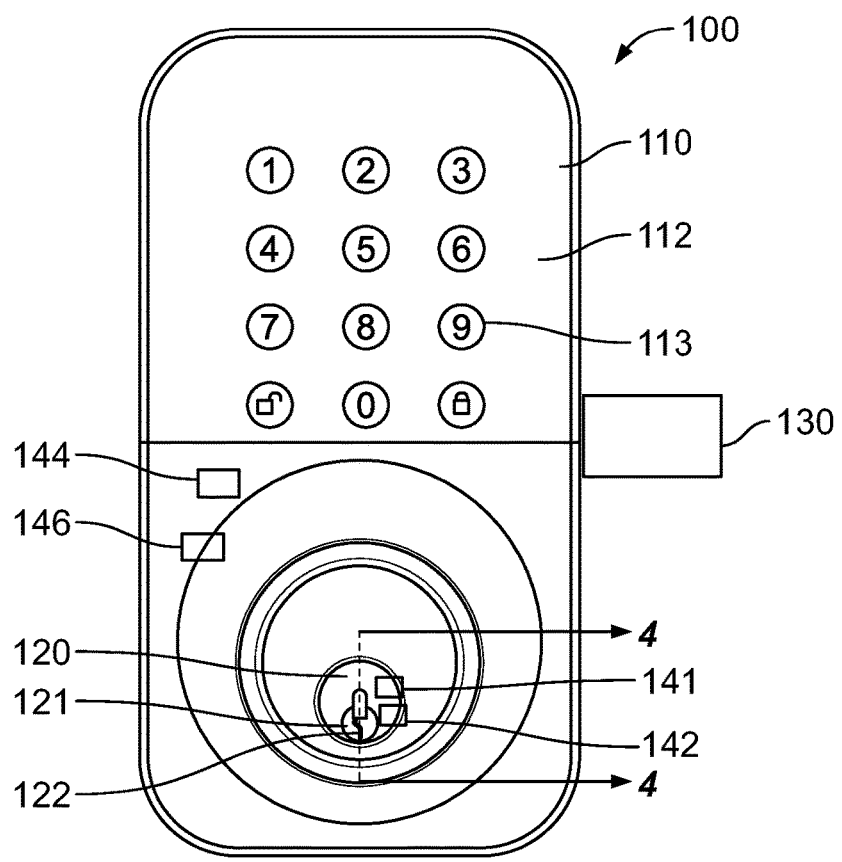
FIG. 1 is a view of an example lock having an electromagnetic radiation sensor for directly detecting one or more physical characteristics of a key.

In accordance with one aspect of the present disclosure, a lock is provided for controlling access to a secured area. The lock includes a housing configured to be mounted on a movable barrier, such as a door, and a locking member movable between locked and unlocked positions. In one embodiment, the locking member includes a deadbolt or latch that extends into a recess of a strike plate. The lock includes a core in the housing having a keyway configured to receive a key. Turning the core relative to the housing causes the locking member to move between the locked and unlocked positions.

The lock includes at least one sensor configured to directly sense at least one characteristic of an object in the keyway. The at least one sensor may be an electromagnetic radiation sensor which utilizes, for example, visible light, infrared light, radio waves, x-rays, or a combination thereof. In some forms, the at least one electromagnetic radiation sensor includes at least one source configured to emit electromagnetic radiation at an object in the keyway and at least one detector configured to detect at least a portion of the electromagnetic radiation emitted at the object in the keyway. In one embodiment, the electromagnetic radiation sensor includes an optical sensor having a source for emitting visible light and a detector configured to detect at least a portion of the emitted light reflected from the bitting of the key in the keyway. In another embodiment, the electromagnetic radiation sensor includes an optical sensor configured to detect ambient light.

In one form, the at least one sensor is remote from the housing of the lock. The at least one sensor is configured to directly sense at least one characteristic of a key outside of the keyway. For example, the at least one sensor may be mounted to a wall near the lock and the a user positions a key in proximity to the at least one sensor. The sensor communicates key information wirelessly with communication circuitry of the lock and a processor of the lock determines whether the key is authorized to open the lock. As another example, the at least one sensor is the camera of a user device, such as a smartphone or tablet, and the user device communicates key information to communication circuitry of the lock and the processor of the lock determines whether the key is authorized to open the lock.

In one embodiment, the lock has a processor configured to determine a sensed characteristic of the object in the keyway based at least in part on the portion of the electromagnetic radiation detected by the at least one detector. The processor is further configured to compare the at least one sensed characteristic to at least one stored characteristic of an authorized key, the stored characteristic contained in a memory of the lock or a remote resource. In some forms, the detector is positioned on the same side of the keyway as the source and is configured to detect electromagnetic radiation reflected by an object in the keyway. In another embodiment, the detector is on an opposite side of the keyway from the source and is configured to detect the shape or silhouette of the object by detecting the electromagnetic radiation not blocked by the object. In some forms, the detector comprises a plurality of detectors spaced along the length or central axis of the keyway. Similarly, the source in some forms comprises a plurality of sources.

The lock further includes a linear actuator or rotary actuator such as a motor configured to control movement of the locking member between the locked and unlocked positions. The processor causes the actuator to permit movement of the locking member between the locked and unlocked positions in response to the processor determining that the at least one characteristic of the object in the keyway corresponds to the at least one authorized key characteristic.

In some forms, the actuator is configured to control movement of the locking member by actuating a blocking member, such as a pin or piston, configured to restrict movement of the core or the locking member. Alternatively or additionally, the actuator may be configured to drive the locking member such that movement of the locking member is permitted by driving the locking member between the locked and unlocked positions.

In some forms, the lock is part of a system that further includes a user device, such as a personal computer, laptop computer, tablet computer, smartphone, or wearable device such as a smart watch. The lock includes wireless communication circuitry communicatively coupled to the user device. The user device communicates key characteristic data to the lock directly, such as via Bluetooth, or indirectly, such as via a wireless access point (e.g., a Wi-Fi router or modem) to which the lock and the user device are connected. The processor of the lock stores the key characteristic data in the memory to be used for comparison with data from the electromagnetic radiation sensor.

The memory of the lock stores data representative of one or more authorized key characteristics associated with one or more authorized keys. Upon an object being inserted into the keyway, the at least one source emits electromagnetic radiation, e.g. visible light, into the keyway. The at least one detector detects at least a portion of the electromagnetic radiation. Data from the detector correlates to a characteristic of the object inserted into the keyway, such as shapes and/or depths of cuts of a key bitting. The characteristic is compared to the one or more authorized key characteristics stored in the memory to determine whether the object in the keyway is a valid or authorized key. Upon the sensed characteristic(s) matching the authorized key characteristic(s), the motor operates to permit movement of the locking member from the locked position to the unlocked position.

In one embodiment, new key characteristic data may be transmitted from a computing device, such as a user device or a remote server computer, to the lock. The processor of the lock stores the transmitted new key characteristic data in memory and uses the data to define whether a key is authorized. By this method, the lock may be reconfigured to accept new keys (e.g., an existing key in the possession of a non-resident guest to whom temporary access is granted) without physically adjusting the lock. In another embodiment, the lock enters a learning mode in response to receiving a learning mode signal from a computing device. The lock, in the learning mode, detects and stores at least one sensed characteristic of a key in the keyway in the memory of the lock. The sensed characteristic is learned as an authorized key characteristic. The lock may also receive a program signal from the computing device that causes the lock to transmit the sensed key characteristic to one or more other locks which learn the sensed key characteristics as an authorized key characteristic. In this manner, a single lock may be used to program all the locks at a facility to recognize a new key.

Turning to FIG. 1, a lock 100 is provided for securing a door and includes a housing 110 configured to be mounted to the door. The housing 110 has an exterior housing portion 112 configured to be mounted adjacent to an exterior surface of a door and an internal housing portion configured to be mounted within the door. The lock 100 includes a cylinder or core 120 positioned at least partially in the housing 110 and configured to turn relative thereto.

The lock 100 further includes a locking member, such as a latch or a deadbolt 130, shown extending outward from the housing 110. The deadbolt 130 is movable between an extended, locked position (shown) and a retracted, unlocked position. In some forms, the deadbolt 130 is in a retracted position in the unlocked position and is longitudinally shiftable into an extended, locked position. In one embodiment, the deadbolt 130 is partially positioned within the door and is extendable into a recess of a strike plate or door jamb to interfere with movement of the door relative to a frame of the door.

The deadbolt 130 is operatively coupled to the core 120 such that, upon an authorized key being inserted into a keyway 122 of the core 120, turning of the core 120 relative to the housing 110 causes the deadbolt 130 to move between the locked and unlocked positions. In one embodiment, the core 120 is mechanically connected to the deadbolt 130 by a coupling such as, for example, one or more gears to translate turning of the core 120 into linear movement (or rotary movement, in some embodiments) of the deadbolt 130. The lock 100 may include a user interface, such as a keypad 113, that permits a user to operate the lock 100 without a key. The user interface may also include a thumbturn on the internal housing portion configured on the interior side of the door.

The keyway 122 extends into the core 120 and includes an opening 121 configured to receive a key. The lock 100 includes an electromagnetic radiation source, such as source 141 configured to emit electromagnetic radiation into the keyway 122. At least a portion of the electromagnetic radiation emitted by the source 141 is detected by one or more electromagnetic radiation detectors 142. The source 141 and the detector 142 may be configured in the core 120 or adjacent to the core within the housing 110. In some forms, one or both of the source 141 and the detector 142 are mounted in the housing 110. The detector 142 is communicatively coupled to a controller 144 that includes a processor 148 and a memory 149 (see FIG. 2). The source 141 and detector 142 are configured to directly sense a key by emitting electromagnetic radiation into the keyway 122 so that the electromagnetic radiation contacts the key itself. This provides one approach for determining whether a key is authorized without having to rely on a mechanical device to translate the shape of the key into an interface detectable by the lock.

In one form, the source 141 and detector 142 are positioned on opposite sides (e.g. right and left sides) of the keyway 122. The detector 142 detects a portion of the electromagnetic radiation emitted by the source 141 that is not blocked by an object inserted into the keyway 122 and the unblocked electromagnetic radiation is used to determine a key characteristic. In alternative forms, such as those shown in FIGS. 4A-4B and discussed below, the detector and source are positioned on the same side of the keyway and the optical detector detects a portion of the electromagnetic radiation reflected back by the object.

The controller 144 is communicatively coupled to a linear or rotary actuator such as a motor 146. The motor 146 is operable to selectively restrict and/or enable movement of the deadbolt 130 from the locked position to the unlocked position. The motor 146 may be mounted in the housing 110. In some forms, the motor 146 is operable to restrict movement of the deadbolt 130 by restricting rotation of the core 120 relative to the housing 110. For example, the motor 146 moves a blocking member, such as a pin 147, in directions 147A into and out of engagement with a hole 147B (see FIG. 4A) of the core 120. In another example, the motor 146 moves the blocking member into and out of interference with the deadbolt 130 to inhibit or permit movement of the deadbolt 130 between locked and unlocked positions. Alternatively or additionally, the motor 146 is configured to move the deadbolt 130 between the locked and unlocked positions.

In some forms, the detector 142 is remote from the housing 110. For example, the detector 142 may be mounted on a surface, such as a wall or door frame, adjacent to the barrier. The detector 142 detects at least one characteristic of a key placed proximate the detector 142 and communicates with the processor 148. In some forms, the lock 100 does not include a core 120 with a keyway 122.

Figure 2:
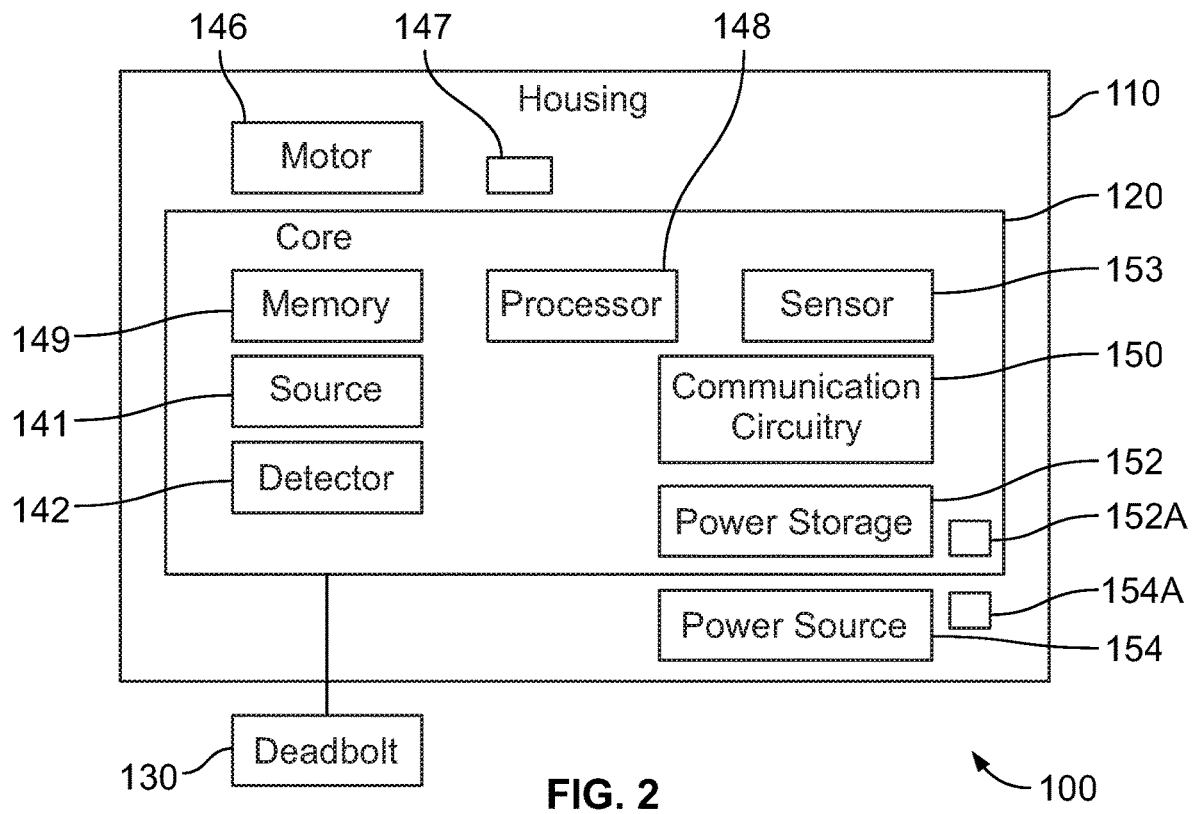
FIG. 2 is an example block diagram of the lock of FIG. 1.

FIG. 2 is a block diagram illustrating the lock 100. The lock 100 includes the processor 148 communicatively coupled to the memory 149, an electromagnetic radiation sensor which may include the source 141 and detector 142, and communication circuitry 150. The lock 100 further includes a power storage device 152, such as a battery or capacitor. The processor 148, memory 149, source 141, detector 142, communication circuitry 150, and power storage device 152 may all be provided in the core 120. In other embodiments, one or more of the processor 148, memory 149, source 141, detector 142, and communication circuitry 150 may be positioned in the housing 110 outside of the core 120.

In order to reduce the volume of components mounted in the core 120, the power storage device 152 may be relatively small. The power storage device 152 is operatively coupled to a power source 154 outside of the core 120, such as a larger battery mounted within the housing 110. In operation, the power storage device 152 is charged by the power source 154. In one form, the core 120 includes electrical contacts, such as a slip ring for example, configured to form an electrical connection with electrical contacts of the housing 110 when the core 120 is in a specific orientation, so as to close a charging circuit between the power source 154 and power storage device 152. In another embodiment, the power source 154 is electrically coupled to a first coil 152A mounted within the housing 110 that is inductively coupled and used to induce current in a second coil 154A of the core 120. The second coil 154A is electrically coupled to the power storage device 152 so as to charge the power storage device 152 with the induced current.

In one embodiment, the source 141 and/or detector 142 are mounted in the housing 110 outside of the core 120. For example, the detector 142 and source 141 may be mounted outside of the core 120 and positioned proximate apertures in the core 120 allowing electromagnetic radiation from the source 141 to travel into the keyway 122 and then to the detector 142. In some forms, the apertures are the pin holes of a preexisting tumbler lock and the source 141 and detector 142 are retrofitted onto the preexisting tumbler lock.

In some forms, the lock 100 includes a sensor 153 for detecting movement of the core 120 relative to the housing 110. The sensor 153 may detect one or more of the position, orientation, and acceleration of the core 120. The lock 100 further includes communication circuitry 150 for communicatively coupling to a computing device, such as directly to a user device or indirectly to a remote server computer. If the processor 148 detects partial movement of the core 120 via the sensor 153, but not the presence of a valid key, the processor 148 determines that the lock 100 may be tampered with or picked. The processor 148 may cause the communication circuitry 150 to transmit an alert to the computing device to alert a user of the possible picking attempt. Additionally or alternatively, the lock 100 includes a local alert device, such as a light and/or a sound emitter, that is activated by the processor 148 in response to determining that the lock 100 may be tampered with or picked.

Additional or alternative detectors may be used to detect picking attempts. For example, electrical contacts positioned along the length and/or width of the keyway 122 may be used to detect the presence of a key by the key closing an electrical circuit between the electrical contacts. A lock pick would not complete the electrical circuit because lock picks are generally smaller than a key and would not be in contact with all of the electrical contacts. If the processor 148 detects the presence of an object in the keyway by the source 141 and detector 142, but does not detect a key in the keyway 122 by the electrical contacts, the processor 148 may cause the communication circuitry 150 to transmit an alert of a possible picking attempt to the user device.

Figure 3:
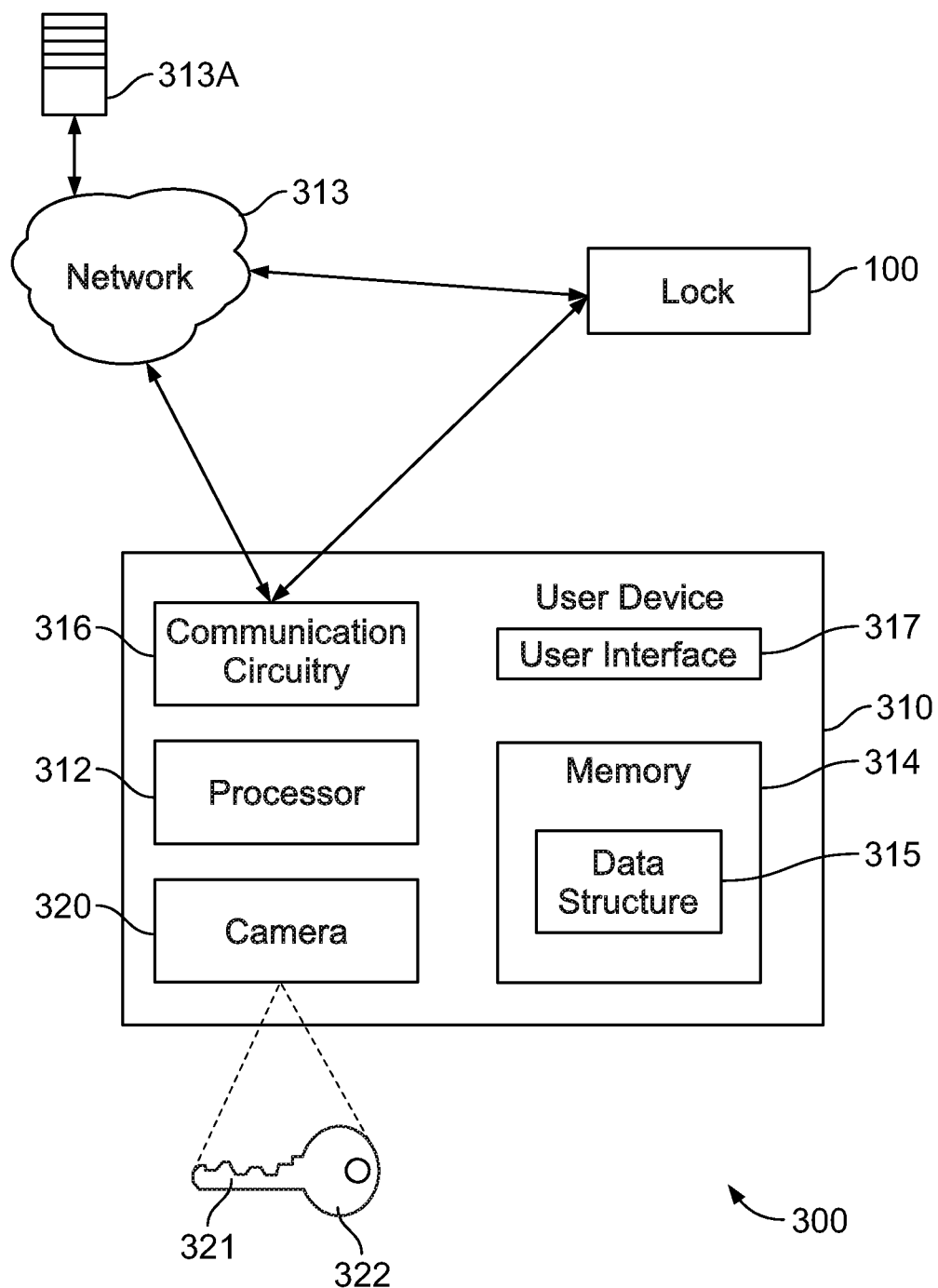
FIG. 3 is a block diagram of an example system including the lock of FIGS. 1-2.

FIG. 3 illustrates a system 300 including the lock 100, a user device 310, and a server computer 313A. The user device 310 and/or the server computer 313A are used to program and control the lock 100. The user device 310 includes a processor 312, a memory 314, communication circuitry 316, and a camera 320. The memory 314 stores a data structure 315 of key characteristic data. The camera 320 may be a remote camera, or a camera integrated in the user device 310 (for example, the built-in camera of a smartphone, smart watch, or tablet computer).

The user device 310 includes a user interface 317 that may include, for example, one or more of a display, a touchscreen display, a keypad, a microphone, a speaker, an augmented reality display, or a combination thereof. The user interface 317 is configured to provide the user with information regarding the lock 100 and/or receive a user input. The user input may be, for example, a request to cause a lock 100 to learn the key 322. Other examples of user inputs include requests to lock or unlock the lock 100. In one embodiment, the user interface 317 includes a display operable to display a graphical user interface that provides a wizard for a user to photograph the key 322 using the camera 320 and instructing the lock 100 to learn the key 322.

The user device 310 is operable to transmit key characteristic data representative of one or more physical characteristics of a key to the lock 100 and cause the lock 100 to learn the key characteristic data. Conversely, the user device 310 may receive key characteristic data from the lock 100 upon the lock 100 learning a key. The processor 312 may store the received key characteristic in the data structure 315. In some forms, the processor 312 removes previously stored key characteristic data in the data structure 315 and replaces it with the newly transmitted key characteristic data. Further, the lock 100 and/or the user device 310 may communicate key characteristic data to the server computer 313A.

In some embodiments, the camera 320 of the user device 310 is used to capture an image of a key 322. The processor 312 determines key characteristic data from the image using object recognition software or computer vision algorithms. In some forms, the processor 312 generates key characteristic data based on the shape of the key 322 in the image. Alternatively, the processor 312 determines the key characteristic data by comparing an indicium 322 on the key, such as a numerical code, to the data structure 315 which correlates the indicium 322 to key characteristic data. In still further embodiments, the indicium 322 indicates a key physical characteristic, such as the number of and/or depth of recesses in a key bitting.

The system 300 may include a plurality of locks 100 all controlled by the user device 310 and/or server computer 313A. In some forms, each lock 100 is programmed to have the same or substantially similar authorized key characteristic data. In other forms, the locks 100 are individually programmed with unique or distinct sets of authorized key characteristic data. The user device 310 may communicate directly with the locks 100, such as via infrared, near field communication (NFC), radio frequency identification (RFID), Bluetooth, etc., or may communicate indirectly via a wide area network 313 and the server computer 313A. The network 313 may include, for example, a wireless router or access point that instantiates or provides access to a local area network, the internet, a cellular network, or a combination thereof. For example, the user device 310 may communicate key characteristic data for a newly authorized key 321 to the server computer 313A. Such key characteristic data may be a digital image of the newly authorized key or data representative of at least one of the digital image and the key. For example, representative data for a key or digital image of the key may indicate a bitting or other property or properties (e.g. physical, electrical such as resistance, or logical such as a machine-readable identifier stored in a memory device integral with the key). The server computer 313A then communicates the key characteristic data to the locks 100 via the network 313. As another example, the user device 310 may communicate key characteristic data to locks 100 on a wireless network to which the locks 100 and the user device 310 are connected. In another embodiment, the locks 100 operate as a wireless mesh network so that the user device 310 or the server computer 313A communicates the key characteristic data to one of the locks 100 and the one lock 100 propagates the key characteristic data to the other locks 100.

FIGS. 4A-4B illustrate alternative cross-sections of the core 120 wherein the processor 148 utilizes electromagnetic radiation reflected by an object within the keyway 122.

Regarding FIG. 4A, the core 120 includes electromagnetic radiation sensors 442 spaced along the length of the keyway 122. Each electromagnetic radiation sensor 442 has a source portion configured to transmit electromagnetic radiation into the keyway 122 and a detector portion configured to measure a reflected portion of the electromagnetic radiation. In some forms, the electromagnetic radiation is emitted in pulses, such that the time between the emission and the detection can be used to determine the distance between the electromagnetic radiation sensor 442 and the key 322. In some forms, the individual electromagnetic radiation sensors 442 are spaced to line up with individual bits of the key 322. With reference to FIG. 4A, each bit 443 has a surface 444 that reflects a portion of the electromagnetic radiation from the associated sensor 442. Each sensor 442 is communicatively coupled with the processor 148, which compares the sensed characteristic data to stored key characteristic data to determine if the key 322 is an authorized key.

In one embodiment, the processor 148 utilizes data from the sensors 442 to generate a pattern of the bitting of the key 321. The pattern may be determined using, for example, a reflection of the entire bitting, points of the bitting, or a percentage of light reflected from the bitting. In some embodiments, the sensors 442 are each aligned with one of the key bits 443 when the key 321 is positioned in the core 120 and the processor 148 uses the sensors 442 to measure at least one of the depth, height or shape of the associated bit 443. One or more of the sensors 442, key 321, and core 120 may be configured to separate (e.g. using partitions) the electromagnetic radiation emitted by the sensors 442 so that the emitted electromagnetic radiation from one sensor 442 does not interfere with the electromagnetic radiation emitted by the other sensors 442. In another embodiment, fewer than all of the sensors 442 are operated at a time to stagger the emission and detection of the electromagnetic radiation to limit interference. For example, each sensor of a plurality may be activated and deactivated one after another in a serial manner. As yet another example, the sensors 442 may emit different electromagnetic radiation, e.g. light at different frequencies, to limit interference between the sensors 442.

In FIG. 4B, a single electromagnetic radiation sensor 442 is configured to emit electromagnetic radiation along a substantial portion of the length of the keyway 122 so as to determine the shape of the bitting of the key 322. The sensor 442 emits the electromagnetic radiation in pulses and the timing of the sensed reflections is used by the processor 148 to determine the shape of the key bittings.

In another approach, a single source 141 is configured to emit electromagnetic radiation along a substantial portion of the length of the keyway 122, and a plurality of detectors 142 are spaced along the length of the keyway 122 to detect a portion of the electromagnetic radiation sensed.

The lock 100 may be configured to use a standard tumbler lock key 321 with bits 443 cut into an edge thereof. The use of a tumbler key allows conventional tumbler locks to be retrofit with the core 120 and components thereof including processor 148, memory 149, source 141, detector 142, communication circuitry 150, and power storage 152 without needing to reissue new keys. It also allows a single key to open both locks 100 as well as conventional tumbler locks.

In alternative embodiments, other types of keys may be used. FIG. 5 illustrates a key 531 having an indicium 532, such as a machine-readable code (e.g bar codes including quick response (QR) codes, UPC codes, etc.), on a surface of the key 531. In operation, the portion of the key 531 with the indicium 532 is inserted into the keyway 122 of the lock 100. The processor 312 uses the source 141 and detector 142 to determine the shape and/or color of the indicium 532 from reflected electromagnetic radiation. The processor 148 of the lock 100 compares the observed indicium 532 to stored key characteristic data to determine whether the indicium 532 corresponds to a valid key.

FIGS. 6A-6B illustrates a key 631 having a plurality of cavities 632 in a surface thereof. As shown in FIG. 6B, the cavities 632 vary in depth. In operation, the bitting 633 of the key 631 having the cavities 632 is inserted into the keyway 122. The processor 148 determines the depths and/or locations of the cavities 632 based on data from the source 141 and the detector 142 and compares the data of the sensed characteristic to stored key characteristic data.

Each of the illustrated keys have a relatively wide head portion with a relatively narrow shank portion as in traditional tumbler lock keys. It is understood that other types of keys are usable with the locks described herein. For example keycards or badges or a 2D image as displayed on a screen.

Additionally or alternatively to the physical characteristics described above, the detector may be configured to detect other characteristics of the key, such as a magnetic or electromagnetic field produced by the key. In one form, the key contains a chip, such as an RFID chip, having characteristics detected by the detector.

Figure 7:
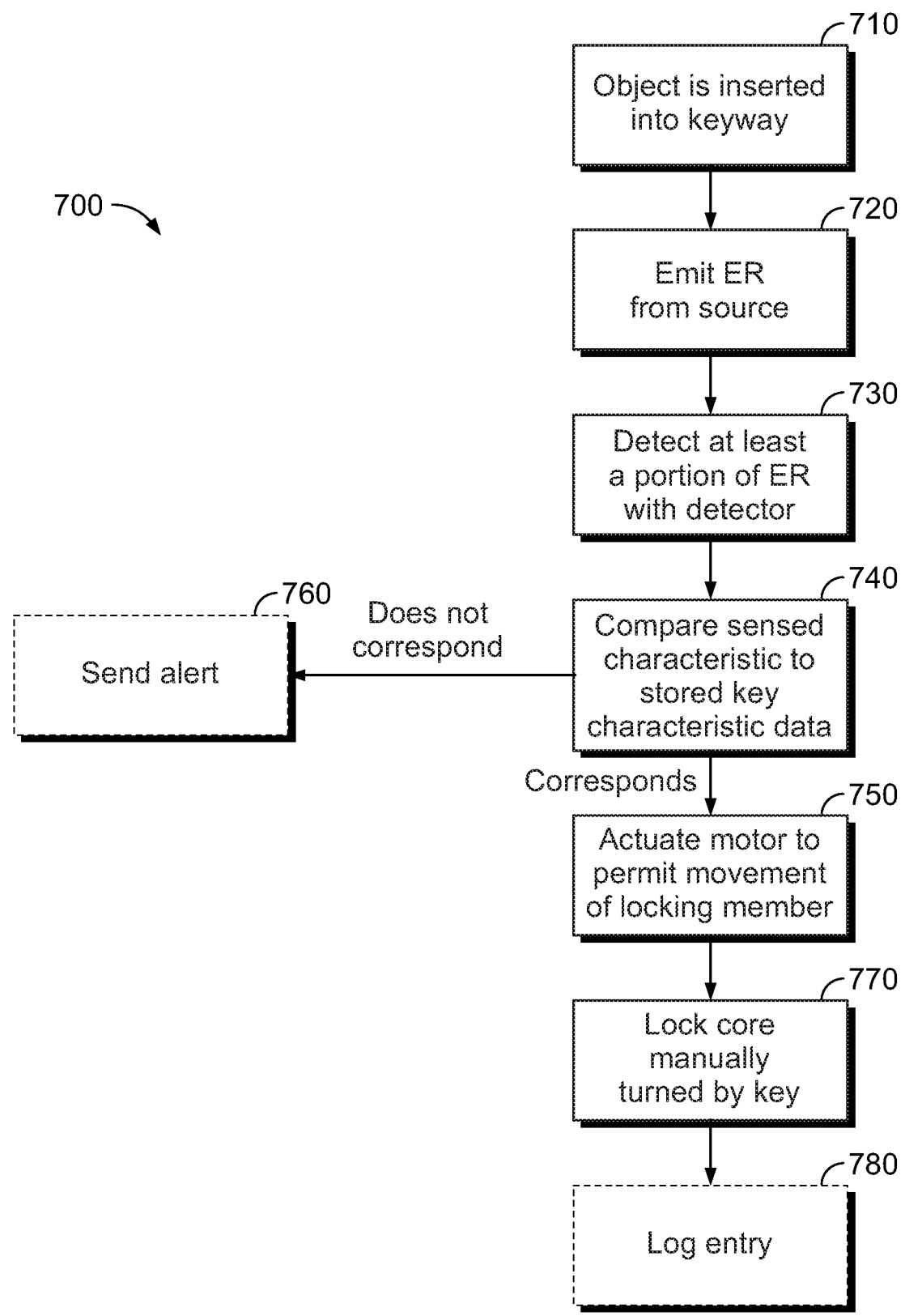
FIG. 7 is a flow chart of an example method of operating a lock.

FIG. 7 illustrates an example method 700 of controlling access through a barrier performed by the lock 100. Upon an object being inserted 710 into the keyway 122 and detection of the insertion, the source 141 emits 720 electromagnetic radiation into the keyway 122. In some forms, the lock 100 is configured to detect when an object is inserted, such as by a mechanical gate or electrical contacts, and the processor 148 causes the source 141 to emit the electromagnetic radiation in response to the object being detected. In alternative forms, the source 141 continuously emits electromagnetic radiation into the keyway 122. In still further alternatives, the detection steps are performed outside of the keyway 122 and thus are not done in response to the processor detecting insertion of a key. For example, the shape of the key is detected by utilizing a camera of a user device, such as a smartphone or tablet. The user device then transmits the data to the lock, either directly (e.g., Bluetooth) or indirectly (e.g., via an internet and a server computer).

At least a portion of the electromagnetic radiation is detected 730 by one or more detectors 142. As discussed above, the detectors 142 are configured to detect electromagnetic radiation reflected by the object, or the portion of electromagnetic radiation not blocked or reflected by the object as some examples.

The processor 148 compares 740 the data from the detectors 142 to stored key characteristic data. If the detector data matches or substantially corresponds to the stored data, the processor 148 determines that the object in the keyway 122 is a valid key and the motor 146 is actuated 750 to move or otherwise enable the deadbolt 130 to be moved. If the data does not match, the processor 148 determines that the object in the keyway 122 is not a valid key such that the motor is not actuated. In some forms, an alert is transmitted 760 to a user device indicating an attempted unapproved entry to the secured area.

After the motor 146 has been actuated, the core 122 may be turned to move the deadbolt 130 from the locked position to the unlocked position. In one form, the core 120 is may be turned 770 relative to movement of the key by a user. In other embodiments, the motor 146 moves the deadbolt 130 between the locked and unlocked positions.

In some forms, locking and unlocking of the lock 100 are recorded in a data structure or log stored 780 in the memory 149. The lock 100 is configured to store a plurality of key characteristics corresponding to a plurality of valid keys. Each valid key is associated with a particular user or users. By this method, the log indicates who entered the secured area at what times. In some forms, the log data is transmitted to a user device and/or a server.

In some forms, the lock 100 is configured to be programmed locally at the lock 100. To program the lock 100, the lock 100 is placed into a learning mode. In some forms, the lock 100 is placed in a learning mode upon receipt of a wireless signal. Alternatively or in addition, insertion of a particular key into the keyway 122 causes the lock 100 to enter a learning mode.

Upon a key being placed in the keyway 122 while the lock 100 is in the learning mode, data from the source 141 and/or detector 142 is used to identify characteristic data. In some forms, previously stored key characteristic data is deleted or removed and replaced with the key characteristic data sensed while the lock 100 is in the learning mode. Once the lock exits the learning mode and returns to an operating mode, the processor 148 of the lock 100 compares sensed data of objects inserted into the keyway 122 to the stored key characteristic data learned while the lock 100 was in the learning mode.

Although method steps may be presented and described herein in a sequential fashion, one or more of the steps shown and described may be omitted, repeated, performed concurrently, and/or performed in a different order than the order shown in the figures and/or described herein. It will be appreciated that computer-readable instructions for facilitating the methods described above may be stored in various non-transitory computer readable mediums as is known in the art. It is noted that the phrase "at least one of A and B" if used herein is used in the disjunctive sense, i.e., "at least one of A and B," and is intended to encompass A, B, or A and B.

Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A lock apparatus for securing a door, the lock apparatus comprising:
   a housing configured to be mounted on a door;
   a locking member movable between locked and unlocked positions;
   a core having a keyway to receive a key, the core configured to turn relative to the housing with turning of the key received in the keyway;
   a motor configured to control movement of the locking member between the locked and unlocked positions;
   an electromagnetic radiation sensor of the core, the electromagnetic radiation sensor to turn with the core relative to the housing upon turning of the key received in the keyway;
   wherein the electromagnetic radiation sensor is configured to sense at least one physical characteristic of the key;
   communication circuitry configured to receive a wireless signal including authorized key data representative of at least one authorized physical characteristic of an authorized key;
   a memory configured to store the authorized key data; and
   a processor operatively coupled to the motor, the electromagnetic radiation sensor, the communication circuitry, and the memory;
   the processor configured to: compare the at least one physical characteristic of the key to the at least one authorized physical characteristic of the authorized key; and cause the motor to permit movement of the locking member between the locked and unlocked positions in response to the at least one physical characteristic of the key corresponding to the at least one authorized physical characteristic of the authorized key.

2. The lock apparatus of claim 1
   wherein the electromagnetic radiation sensor is further configured to directly sense the at least one physical characteristic of the key upon insertion in the keyway.

3. The lock apparatus of claim 1 wherein the communication circuitry is further configured to receive a second wireless signal including second authorized key data representative of at least one second authorized physical characteristic of a second authorized key; and
   the processor is further configured to delete from the memory the authorized key data representative of the at least one authorized physical characteristic of the authorized key upon the communication circuitry receiving the second wireless signal.

4. The lock apparatus of claim 1 wherein the processor includes a learning mode in which the processor is further configured to store learned key data in the memory representative of the at least one physical characteristic of the key.

5. The lock apparatus of claim 4 wherein the processor is further configured to remove the authorized key data representative of the at least one authorized physical characteristic of the authorized key from the memory upon the processor storing the learned key data in the memory.

6. The lock apparatus of claim 4 wherein the communication circuitry is further configured to receive a learning mode wireless signal, and wherein the processor is further configured to enter the learning mode upon the communication circuitry receiving the learning mode wireless signal.

7. The lock apparatus of claim 1 wherein the processor includes a communication mode in which the processor causes the communication circuitry to transmit a lock wireless signal including data representative of the at least one physical characteristic of the key.

8. The lock apparatus of claim 7 wherein the communication circuitry configures the lock wireless signal to cause at least one other lock to store the data representative of the at least one physical characteristic of the key in a memory of the at least one other lock.

9. The lock apparatus of claim 1 wherein the electromagnetic radiation sensor includes:
    at least one source configured to emit electromagnetic radiation at the key; and
    at least one detector configured to detect electromagnetic radiation reflected by the key.

10. The lock apparatus of claim 1 wherein the processor is further configured to cause the motor to permit movement of the locking member between the locked and unlocked positions by causing the motor to shift a blocking member from a first position in which the blocking member inhibits turning of the core to a second position in which the blocking member permits turning of the core.

11. The lock apparatus of claim 1 wherein the processor is further configured to cause the motor to inhibit movement of the locking member between unlocked and locked positions in response to the at least one physical characteristic of the key not corresponding to the at least one authorized physical characteristic of the authorized key.

12. The lock apparatus of claim 1 wherein the electromagnetic radiation sensor is remote from the housing.

13. The lock apparatus of claim 1 wherein the core is operatively connected to the locking member so that turning of the core causes shifting of the locking member between the locked and unlocked positions.

14. A method of controlling access to a secured area, the method comprising:
    at a lock apparatus comprising a housing mounted to a door, a locking member movable between locked and unlocked positions, and an electromagnetic radiation sensor:
        receiving, via a wireless receiver of the lock apparatus, a wireless signal including authorized key data representative of at least one authorized physical characteristic of an authorized key;
        storing the authorized key data in a memory of the lock apparatus;
        passing an electrical current through an object in a keyway of the lock apparatus;
        detecting the electrical current via an electrical sensor of the lock apparatus;
        determining whether the object is a key based at least in part on the electrical current detected by the electrical sensor;
        sensing, with the electromagnetic radiation sensor, at least one physical characteristic of the key;
        comparing the at least one physical characteristic of the key to the at least one authorized physical characteristic of the authorized key; and
        causing a motor of the lock apparatus to permit movement of the locking member between the locked and unlocked positions in response to the at least one physical characteristic of the key corresponding to the at least one authorized physical characteristic of the authorized key.

15. The method of claim 14 wherein sensing the at least one physical characteristic of the key comprises sensing the at least one physical characteristic of the key within the keyway of a core of the lock apparatus, wherein the core is configured to be turned relative to the housing to cause the locking member to move between the locked and unlocked positions.

16. The method of claim 14 further comprising receiving a second wireless signal including second authorized key data representative of at least one second authorized physical characteristic of a second authorized key; and
    removing from the memory the authorized key data representative of the at least one authorized physical characteristic of the authorized key upon communication circuitry of the lock apparatus receiving the second wireless signal.

17. The method of claim 14 further comprising storing learned key data representative of the at least one physical characteristic of the key in the memory.

18. The method of claim 17 further comprising removing the authorized key data representative of the at least one authorized physical characteristic of the authorized key from the memory upon a processor of the lock apparatus storing the learned key data in the memory.

19. The method of claim 17 further comprising receiving, at communication circuitry of the lock apparatus, a learning mode wireless signal; and
    entering a learning mode upon the communication circuitry of the lock apparatus receiving the learning mode wireless signal before storing the learned key data in the memory.

20. The method of claim 14 further comprising transmitting, from communication circuitry of the lock apparatus, a lock wireless signal including data representative of the at least one physical characteristic of the key.

21. The method of claim 20 further comprising causing at least one other lock to store the data representative of the at least one physical characteristic of the key in at least one memory of the at least one other lock.

22. The method of claim 14 wherein causing the motor of the lock apparatus to permit movement of the locking member includes causing the motor to shift a blocking member from a first position in which the blocking member inhibits turning of a core of the lock apparatus to a second position in which the blocking member permits turning of the core of the lock apparatus.

23. The method of claim 14 further comprising causing the motor to inhibit movement of the locking member in response to the at least one physical characteristic of the key not matching the at least one physical characteristic of the authorized key.

24. A lock apparatus for securing a door, the lock apparatus comprising:

a housing configured to be mounted on a door;

a core having a keyway to receive a key, the core configured to turn relative to the housing;

a locking member operatively connected to the core, the locking member shifting between locked and unlocked positions with turning of the core;

a blocking member;

a motor configured to shift the blocking member between a blocking position wherein the blocking member inhibits turning of the core relative to the housing and a clearance position wherein the blocking member permits turning of the core relative to the housing;

an electromagnetic radiation sensor configured to sense at least one physical characteristic of a key;

communication circuitry configured to receive a wireless signal including authorized key data representative of at least one authorized physical characteristic of an authorized key;

a memory configured to store the authorized key data; and a processor operatively coupled to the motor, the electromagnetic radiation sensor, the communication circuitry, and the memory;

the processor configured to:
  compare the at least one physical characteristic of the key to the at least one authorized physical characteristic of the authorized key; and
  cause the motor to shift the blocking member from the blocking position to the clearance position in response to the at least one physical characteristic of the key corresponding to the at least one authorized physical characteristic of the authorized key.

25. The lock apparatus of claim 24 wherein the core has a recess; and
  wherein the blocking member has a portion extending in the recess of the core with the blocking member in the blocking position.

26. The lock apparatus of claim 24 wherein the core includes a keyway; and
  wherein the electromagnetic radiation sensor is configured to directly sense the at least one physical characteristic of the key upon insertion in the keyway.

* * * * *